(12) United States Patent
Sakikawa

(10) Patent No.: US 7,523,610 B2
(45) Date of Patent: Apr. 28, 2009

(54) NEUTRAL VALVE STRUCTURE

(75) Inventor: Shigenori Sakikawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 206 days.

(21) Appl. No.: 11/435,821

(22) Filed: May 18, 2006

(65) Prior Publication Data

US 2006/0260302 A1 Nov. 23, 2006

(30) Foreign Application Priority Data

May 23, 2005 (JP) ............................. 2005-149091

(51) Int. Cl.
*F16D 31/02* (2006.01)
(52) U.S. Cl. .......................... 60/468; 60/489
(58) Field of Classification Search .................. 60/468, 60/489
See application file for complete search history.

(56) References Cited

U.S. PATENT DOCUMENTS

| | | | | |
|---|---|---|---|---|
| 3,522,999 | A | * | 8/1970 | Liles ........................... 417/282 |
| 3,704,588 | A | * | 12/1972 | Trabbic ........................ 60/489 |
| 6,286,309 | B1 | * | 9/2001 | Horton et al. ................. 60/468 |
| 6,425,244 | B1 | | 7/2002 | Ohashi et al. |

FOREIGN PATENT DOCUMENTS

JP  11-351382  12/1999

* cited by examiner

*Primary Examiner*—F. Daniel Lopez
(74) *Attorney, Agent, or Firm*—Sterne, Kessler, Goldstein & Fox P.L.L.C.

(57) ABSTRACT

There is provided a neutral valve structure applied to at least one of a pair of operation fluid lines in an HST, including: a valve body slidable in the axis line direction so as to take a closing position where the corresponding operation fluid line is liquid-tightly closed and a releasing position where the corresponding operation fluid line is released to a low-pressure area; and a biasing member for urging the valve body toward the releasing position on one side of the axis line direction. The valve body includes: a closing-side pressure-receiving portion for receiving the hydraulic pressure of the corresponding operation fluid line so as to press the valve body toward the closing position on the other side of the axis line direction against the urging force of the biasing member; and a releasing-side pressure-receiving portion for receiving the hydraulic pressure of the corresponding operation fluid line so as to press the valve body toward the releasing position on one side of the axis line direction along with the biasing member. The closing-side pressure-receiving portion has a receiving pressure area larger than that of the releasing-side pressure-receiving portion.

12 Claims, 11 Drawing Sheets

NEUTRAL VALVE STRUCTURE

BACKGROUND OF THE INVENTION

1. Field of the Invention

The invention relates to a neutral valve structure applied to an HST or an axial piston device forming the HST.

2. Related Art

In a hydrostatic transmission (HST) including a hydraulic pump body and a hydraulic motor body that are fluidly connected to each other by a pair of operation fluid lines, and configured to non-stepwisely change the rotational speed that is inputted into the hydraulic pump body and output the same through a motor shaft supporting the hydraulic motor body by varying an oil supply/suction amount of at least one of the hydraulic pump body and the hydraulic motor body based on the operation of an output adjusting member. The following two configurations have been conventionally proposed in order to obtain a neutral state (a state where the output of the hydraulic motor unit is zero), without locating the output adjusting member at a neutral point strictly.

In a first configuration, a charge line for supplying pressure oil to the pair of operation fluid lines is constantly connected with at least one (for example, a rearward-movement high-pressure-side operation fluid line becoming high pressure when a vehicle moves rearward) of the pair of the operation fluid lines via an orifice (see, for example, U.S. Pat. No. 6,425,244).

In detail, check valves are respectively inserted between the charge line and the pair of operation fluid lines. In the configuration, by providing the orifice in the check valve, which is, for example, provided between the charge, line and the rearward-movement high-pressure-side operation line, it is possible to prevent hydraulic difference between the pair of operation fluid lines from occurring against an operator's intention.

However, the first configuration is not preferable in view of the transmission efficiency of the HST, since the operation oil is constantly leaked from the operation fluid line on the side at which the orifice is provided.

That is, if a diameter of the orifice is reduced, the transmission efficiency of the HST could be improved. However, on the other hand, a neutral width is reduced.

On the contrary, if the diameter of the orifice is increased, the neutral width could be increased. However, the transmission efficiency of the HST is worsened.

A second configuration in which a neutral valve is inserted into at least one of the pair of the operation fluid lines has been proposed in order to solve the fault of the first configuration (for example, see Japanese Unexamined Patent Publication No. H11-351382).

In detail, the neutral valve includes a valve body inserted into the corresponding operation fluid line in a slidable manner along the axis line direction, and a biasing member for urging the valve body against the hydraulic pressure of the corresponding operation fluid line.

When the pressing force due to the hydraulic pressure of the corresponding operation fluid line is smaller than the urging force of the biasing member, the corresponding operation fluid line is fluidly connected to a drain line, and when the pressing force due to the hydraulic pressure of the corresponding operation fluid line exceeds the urging force of the biasing member, the valve body is pushed so that the corresponding operation fluid line is fluidly disconnected to the drain line.

That is, the second configuration is configured so as to prevent the leak from the corresponding operation fluid line through the drain line to prevent the deterioration of the transmission efficiency of the HST in a case that the hydraulic pressure of the operation fluid line is increased, while fluidly connecting the operation fluid line to the drain line so as to secure the neutral width of the HST in a case that the hydraulic pressure of the corresponding operation fluid line is low.

However, since the biasing member receives the hydraulic pressure of the corresponding operation fluid line as it is in the second configuration, a biasing member having a large spring load has to be used, and thereby there was a problem of causing enlargement and high production costs.

The invention has been accomplished in view of the prior art, and it is an object of the invention to provide a neutral valve structure applied to an HST or an axial piston device constituting the HST, capable of securing the neutral width without causing the deterioration of the transmission efficiency of the HST and capable of attaining the miniaturization and the low cost.

SUMMARY OF THE INVENTION

According to a first aspect of the present invention, there is provided a neutral valve structure applied to at least one of a pair of operation fluid lines in an HST.

The neutral valve structure includes: a valve body slidable in the axis line direction so as to take a closing position where the corresponding operation fluid line is liquid-tightly closed and a releasing position where the corresponding operation fluid line is released to a low-pressure area; and a biasing member for urging the valve body toward the releasing position on one side of the axis line direction. The valve body includes: a closing-side pressure-receiving portion for receiving the hydraulic pressure of the corresponding operation fluid line so as to press the valve body toward the closing position on the other side of the axis line direction against the urging force of the biasing member; and a releasing-side pressure-receiving portion for receiving the hydraulic pressure of the corresponding operation fluid line so as to press the valve body toward the releasing position on one side of the axis line direction along with the biasing member. The closing-side pressure-receiving portion has a receiving pressure area larger than that of the releasing-side pressure-receiving portion.

With the configuration, it is possible to prevent the deterioration of the transmission efficiency of the HST in a state where the hydraulic pressure of the corresponding operation fluid line becomes high, while obtaining the neutral state of the HST without a strict operation.

Furthermore, since the positioning control of the valve body is performed by using the pressure difference between the closing-side pressure-receiving portion and the releasing-side pressure-receiving portion as a pilot pressure, the miniaturization of the neutral valve structure can be attained at low cost.

Preferably, the corresponding operation fluid line may be released to the low-pressure area via an orifice when the valve body is located at the releasing position.

For example, the low-pressure area is an oil reservoir.

Alternatively, the low-pressure area is the other operation fluid line.

Preferably, the corresponding operation fluid line is fluidly connected to the other operation fluid line acting as the low-pressure area via a check valve. The check valve is arranged to allow the oil to flow from the corresponding operation fluid line into the other operation fluid line while preventing the reversed flow.

According to a second aspect of the present invention, there is provided a neutral valve structure applied to a port block in which a pair of first and second operation passages configuring at least parts of a pair of operation fluid lines in an HST are formed substantially in parallel with each other.

The port block includes: a linear installation passage intersecting with the first operation passage and having a tip end extending beyond the first operation passage and a base end opened to an outer surface; a releasing passage having a first end fluidly connected to a portion, of the installation passage, extending to the tip-end side beyond the first operation passage and a second end fluidly connected to a low-pressure area; and a neutral valve inserted into the installation passage from the base end and switching fluid-connection or fluid-disconnection between the first operation passage and releasing passage according to the hydraulic pressure of the first operation passage.

The neutral valve includes: a valve body inserted into the installation passage in a slidable manner along the axis line direction so as to straddle the first operation passage, the valve body capable of taking a releasing position on one side of the axis line direction where the first operation passage and the releasing passage are fluidly connected to each other and a closing position on the other side of the axis line direction where the first operation passage and the releasing passage are fluidly disconnected to each other; a biasing member having a tip end engaged to the valve body so as to urge the valve body toward the releasing position on one side of the axis line direction; and a lid member engaging a base end of the biasing member and defining a spring chamber for accommodating the biasing member between the valve body and the lid member.

The valve body includes: a closing-side pressure-receiving portion for receiving the hydraulic pressure of the first operation passage so as to press the valve body toward the closing position on the other side of the axis line direction against the urging force of the biasing member; and a releasing-side pressure-receiving portion for receiving the hydraulic pressure of the first operation passage so as to press the valve body toward the releasing position on one side of the axis line direction along with the biasing member. The releasing-side pressure-receiving portion has a receiving pressure area smaller than that of the closing-side pressure-receiving portion.

With the configuration, it is possible to prevent the deterioration of the transmission efficiency of the HST in a state where the hydraulic pressure of the corresponding operation fluid line becomes high, while obtaining the neutral state of the HST without a strict operation.

Furthermore, since the positioning control of the valve body is performed by using the pressure difference between the closing-side pressure-receiving portion and the releasing-side pressure-receiving portion as a pilot pressure, the miniaturization of the neutral valve structure can be attained at low cost.

According to a third aspect of the present invention, there is provided a neutral valve structure applied to a port block in which a pair of first and second operation passages configuring at least parts of a pair of operation fluid lines in the HST are formed substantially in parallel with each other.

The port block includes: a linear installation passage intersecting with the first and second operation passages and having first and second ends respectively near to the first and second operation passages, both of the first and second ends opened at the outer surface; a drain passage fluidly connected to the installation passage between the first and second operation passages; a releasing passage having a first end fluidly connected to the installation passage between the first operation passage and the drain passage and a second end fluidly connected to a low-pressure area; a neutral valve inserted into the installation passage from the first end and switching fluid-connection or fluid-disconnection between the first operation passage and the releasing passage according to the hydraulic pressure of the first operation passage; and a switch valve inserted into the installation passage from the second end and switching fluid-connection or fluid-disconnection between the second operation passage and the drain passage according to the manual operation.

The neutral valve includes: a valve body inserted into the installation passage in a slidable manner along the axis line direction so as to straddle the first operation passage, the valve body capable of taking a releasing position on one side of the axis line direction where the first operation passage and the releasing passage are fluidly connected to each other and a closing position on the other side of the axis line direction where the first operation passage and the releasing passage are fluidly disconnected to each other; a biasing member having a tip end engaged to the valve body so as to urge the valve body toward the releasing position on one side of the axis line direction; and a lid member engaging a base end of the biasing member and defining a spring chamber for accommodating the biasing member between the valve body and the lid member.

The valve body includes: a closing-side pressure-receiving portion for receiving the hydraulic pressure of the first operation passage so as to press the valve body toward the closing position on the other side of the axis line direction against the urging force of the biasing member; a releasing-side pressure-receiving portion for receiving the hydraulic pressure of the first operation passage so as to press the valve body toward the releasing position on one side of the axis line direction along with the biasing member, the releasing-side pressure-receiving portion having a receiving pressure area smaller than that of the closing-side pressure-receiving portion; and an axis line hole for fluidly connecting the spring chamber and the drain passage.

With the configuration, it is possible to prevent the deterioration of the transmission efficiency of the HST in a state where the hydraulic pressure of the corresponding operation fluid line becomes high, while obtaining the neutral state of the HST without a strict operation.

Furthermore, since the positioning control of the valve body is performed by using the pressure difference between the closing-side pressure-receiving portion and the releasing-side pressure-receiving portion as a pilot pressure, the miniaturization of the neutral valve structure can be attained at low cost.

Moreover, the drain passage for the switch valve could be also used as a drain passage for the spring chamber.

According to a fourth aspect of the present invention, there is provided a neutral valve structure applied to a port block in which a pair of first and second operation passages configuring at least parts of the pair of operation fluid lines in the HST are formed substantially in parallel with each other.

The port block includes: a linear installation passage intersecting with the first and second operation passages and having first and second ends respectively near to the first and second operation passages, both of the first and second ends opened at the outer surface; a drain passage fluidly connected to the installation passage between the first and second operation passages; a first releasing passage having a first end fluidly connected to the installation passage between the first operation passage and the drain passage and a second end fluidly connected to a low-pressure area; a second releasing passage having a first end fluidly connected to the installation passage between the second operation passage and the drain passage and a second end fluidly connected to the low-pressure area; a first neutral valve inserted into the installation passage from the first end and switching fluid-connection or fluid-disconnection between the first operation passage and the first releasing passage according to the hydraulic pressure of the first operation passage; and a second neutral valve inserted into the installation passage from the second end and switching fluid-connection or fluid-disconnection between the second operation passage and the second releasing passage according to the hydraulic pressure of the second operation passage.

Each of the first and second neutral valves includes: a valve body inserted into the installation passage in a slidable manner along the axis line direction so as to straddle the corresponding operation passage, the valve body capable of taking a releasing position on one side of the axis line direction where the corresponding operation passage and the corresponding releasing passage are fluidly connected to each other and a closing position on the other side of the axis line direction where the corresponding operation passage and the corresponding releasing passage are fluidly disconnected to each other; a biasing member having a tip end engaged to the valve body so as to urge the valve body toward the releasing position on one side of the axis line direction; and a lid member engaging a base end of the biasing member and defining a spring chamber for accommodating the biasing member between the valve body and the lid member.

The valve body includes: a closing-side pressure-receiving portion for receiving the hydraulic pressure of the corresponding operation oil passage so as to press the valve body toward the closing position on the other side of the axis line direction against the urging force of the biasing member; a releasing-side pressure-receiving portion for receiving the hydraulic pressure of the corresponding operation oil passage so as to press the valve body toward the releasing position on one side of the axis line direction along with the biasing member, the releasing-side pressure-receiving portion having a receiving pressure area smaller than that of the closing-side pressure-receiving portion; and an axis line hole for fluidly connecting the corresponding spring chamber and the drain passage.

With the configuration, it is possible to prevent the deterioration of the transmission efficiency of the HST in a state where the hydraulic pressure of the corresponding operation fluid line becomes high, while obtaining the neutral state of the HST without a strict operation.

Furthermore, since the positioning control of the valve body is performed by using the pressure difference between the closing-side pressure-receiving portion and the releasing-side pressure-receiving portion as a pilot pressure, the miniaturization of the neutral valve structure can be attained at low cost.

Moreover, the drain passage could be used as drain passages for the spring chambers in both of the first and second neutral valves.

In the above second to fourth aspects, preferably, the installation passage is arranged to be intersected with the first and second operation passages at right angles.

Instead of or in addition to that, the releasing passage may be provided with an orifice.

According to a fifth aspect of the present invention, there is provided a neutral valve structure applied to a port block in which a pair of first and second operation passages configuring at least parts of a pair of operation fluid lines in the HST are formed.

The port block includes: a first releasing passage having a first end fluidly connected to the first operation passage and a second end fluidly connected to a low-pressure area; and a first neutral valve inserted into the first operation passage and switching fluid-connection or fluid-disconnection between the first operation passage and the first releasing passage according to the hydraulic pressure of the first operation passage.

The first neutral valve includes: a valve body inserted into the first operation passage in a slidable manner along the axis line direction, the valve body capable of taking a releasing position on one side of the axis line direction where the first operation passage and the first releasing passage are fluidly connected to each other and a closing position on the other side of the axis line direction where the first operation passage and the first releasing passage are fluidly disconnected to each other; a biasing member having a tip end engaged to the valve body so as to urge the valve body toward the releasing position on one side of the axis line direction; and a lid member engaging a base end of the biasing member and defining the spring chamber for accommodating the biasing member between the valve body and the lid member.

The valve body includes: a closing-side pressure-receiving portion for receiving the hydraulic pressure of the first operation passage so as to press the valve body toward the closing position on the other side of the axis line direction against the urging force of the biasing member; and a releasing-side pressure-receiving portion for receiving the hydraulic pressure of the first operation passage so as to press the valve body toward the releasing position on one side of the axis line direction along with the biasing member, the releasing-side pressure-receiving portion having a receiving pressure area smaller than that of the closing-side pressure-receiving portion.

With the configuration, it is possible to prevent the deterioration of the transmission efficiency of the HST in a state where the hydraulic pressure of the corresponding operation fluid line becomes high, while obtaining the neutral state of the HST without a strict operation.

Furthermore, since the positioning control of the valve body is performed by using the pressure difference between the closing-side pressure-receiving portion and the releasing-side pressure-receiving portion as a pilot pressure, the miniaturization of the neutral valve structure can be attained at low cost.

Preferably, the port block further includes: a second releasing passage having a first end fluidly connected to the second operation passage and a second end fluidly connected to the low-pressure area; and a second neutral valve inserted into the second operation passage and switching fluid-connection or fluid-disconnection between the second operation passage and the second releasing passage according to the hydraulic pressure of the second operation passage.

The second neutral valve includes: a valve body inserted into the second operation passage in a slidable manner along the axis line direction, the valve body capable of taking a releasing position on one side of the axis line direction where the second operation passage and the second releasing passage are fluidly connected and a closing position on the other side of the axis line direction where the second operation passage and the second releasing passage are fluidly disconnected to each other; a biasing member having a tip end locked to the valve body so as to urge the valve body toward the releasing position on one side of the axis line direction; and a lid member engaging a base end of the biasing member and defining a spring chamber for accommodating the biasing member between the valve body and the lid member.

The valve body includes: a closing-side pressure-receiving portion for receiving the hydraulic pressure of the second operation passage so as to press the valve body toward the closing position on the other side of the axis line direction against the urging force of the biasing member; and a releasing-side pressure-receiving portion for receiving the hydraulic pressure of the first operation passage so as to press the valve body toward the releasing position on one side of the axis line direction along with the biasing member, the releasing-side pressure-receiving portion having a receiving pressure area smaller than that of the closing-side pressure-receiving portion.

Preferably, the valve body is provided with an orifice located between the corresponding operation passage and the corresponding releasing passage.

In the various configurations of the above second to fifth aspects, for example, the second end of the releasing passage is fluidly connected to an oil reservoir.

Alternatively, the second end of the releasing passage is fluidly connected to the other operation passage.

In the alternative configuration, the releasing passage is preferably provided with a check valve for allowing oil to flow from the corresponding operation passage into the other operation passage while preventing the reversed flow.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment 1

Hereinafter, a first preferred embodiment of a neutral valve structure according to the present invention will be described referring to the accompanying drawings.

Figure 1:
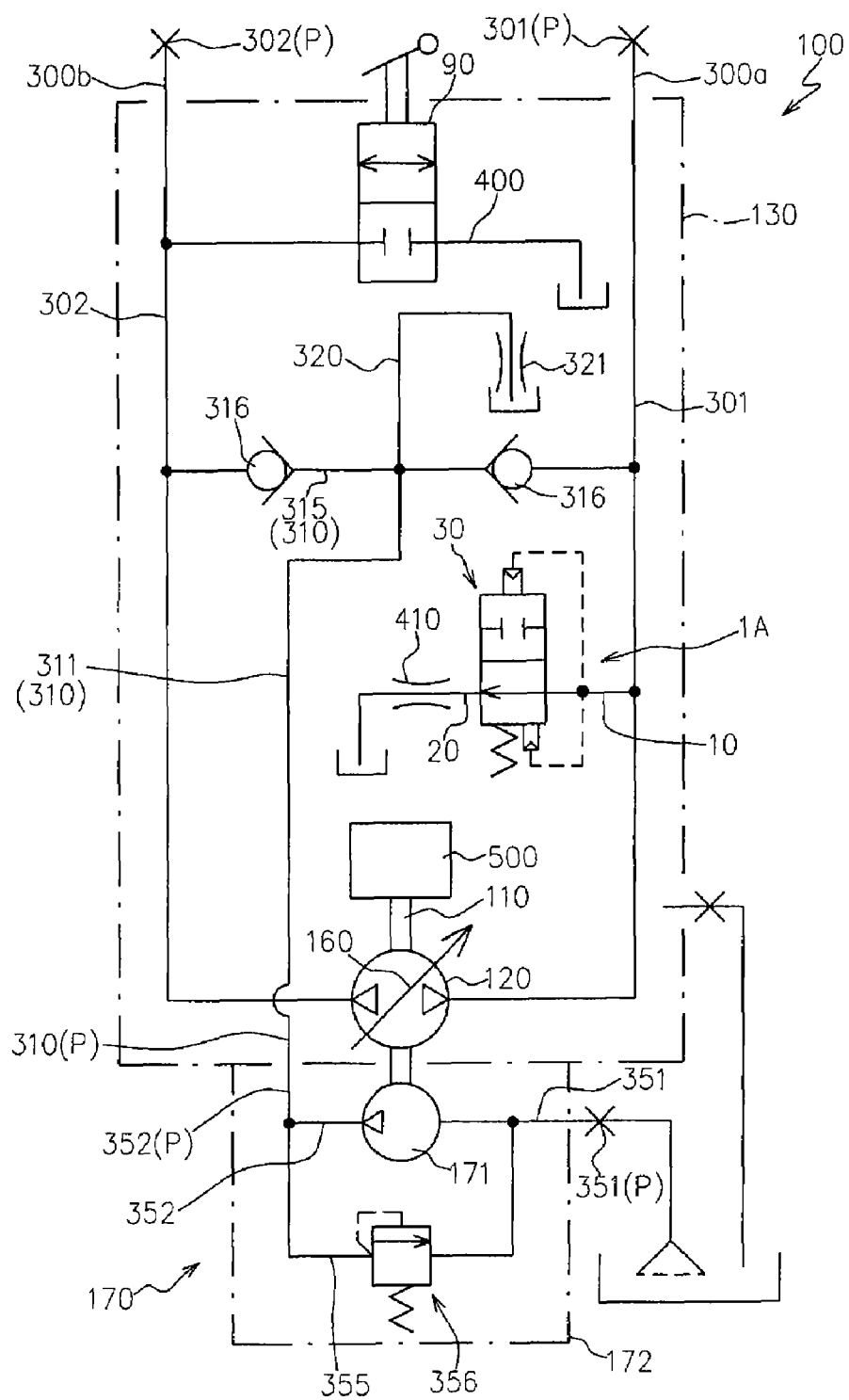
FIG. 1 is a hydraulic circuit diagram of a hydraulic pump unit to which a neutral valve structure according to a first embodiment of the present invention is applied.

FIG. 1 shows a hydraulic circuit diagram of a hydraulic pump unit 100 to which a neutral valve structure 1A according to the present embodiment is applied.

Figure 2:
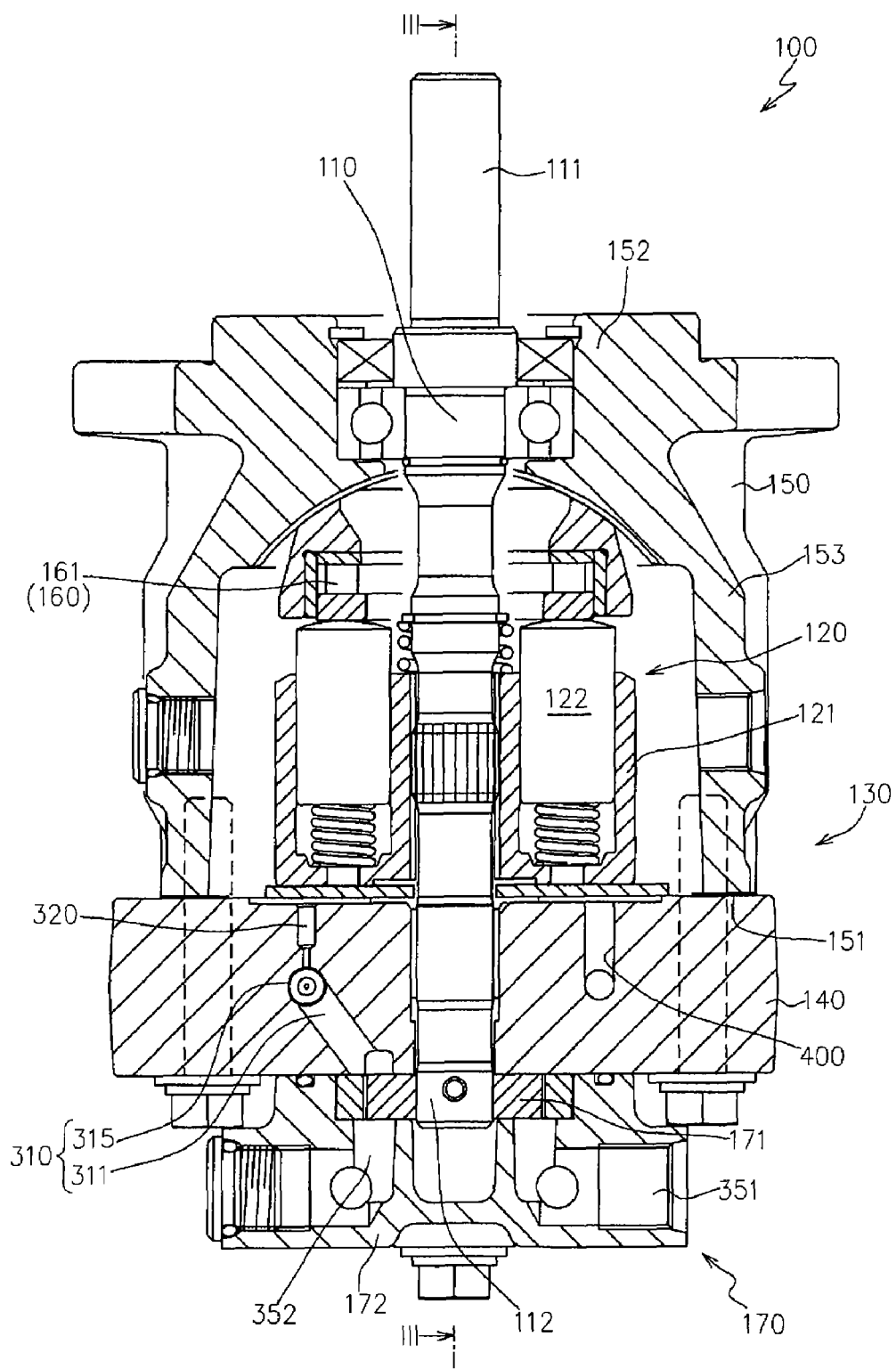
FIG. 2 is a longitudinal sectional view of the hydraulic pump unit shown in FIG. 1.
Figure 3:
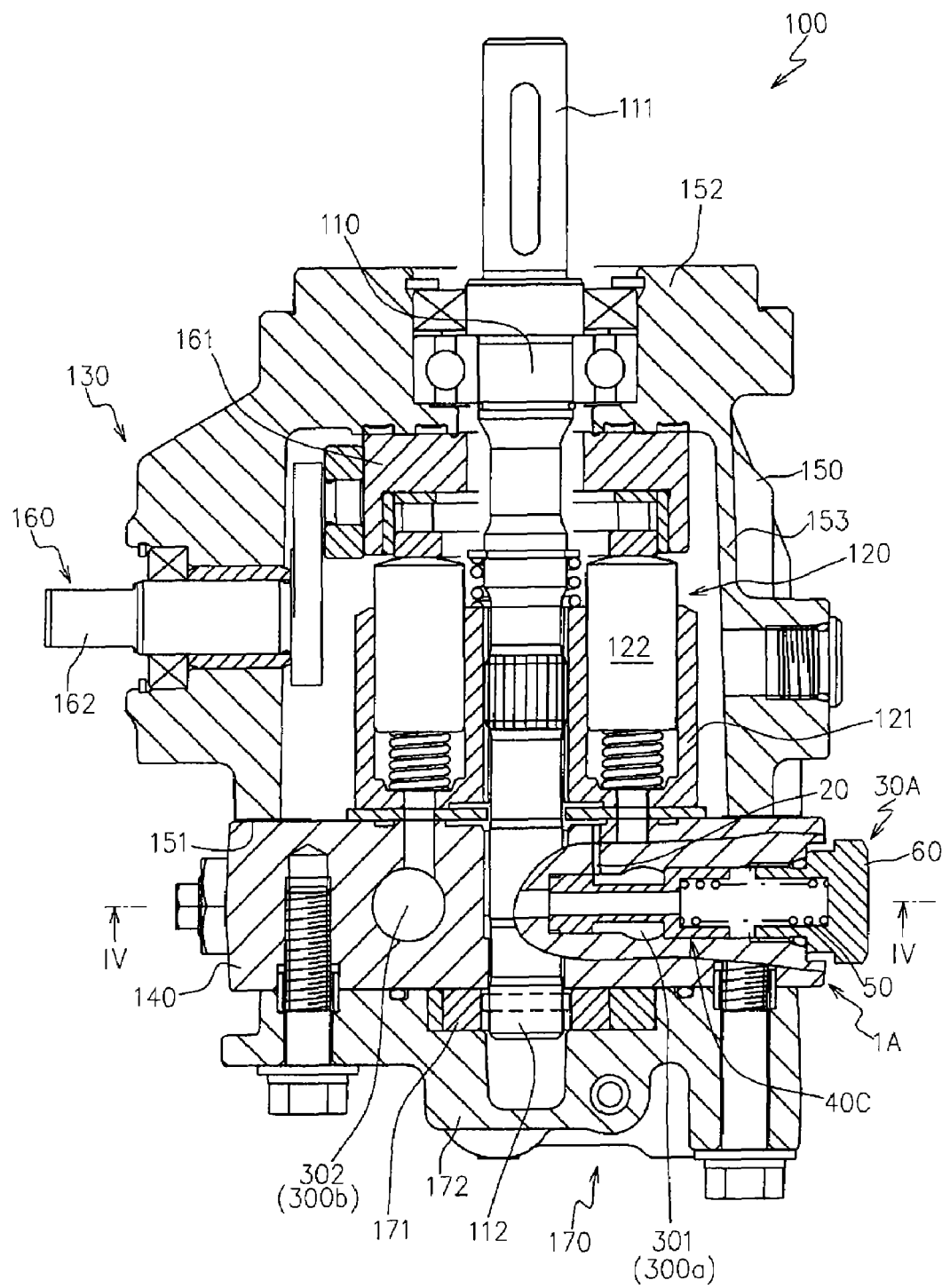
FIG. 3 is a sectional view taken along line III-III in FIG. 2.

FIG. 2 shows a longitudinal sectional view of the hydraulic pump unit 100, and FIG. 3 shows a sectional view taken along line III-III in FIG. 2.

The hydraulic pump unit 100 is configured so as to be fluidly connected to a hydraulic motor unit (not shown) arranged away from the hydraulic pump unit with a space via a pair of first and second operation fluid lines 300a, 300b (see FIG. 1) so as to form an HST in cooperation with the hydraulic motor unit.

Specifically, as shown in FIGS. 1 to 3, the hydraulic pump unit 100 includes a pump shaft 110 operatively connected to a driving source 500, a hydraulic pump body 120 supported in a relatively non-rotatable manner by the pump shaft 110, and a pump case 130 accommodating the hydraulic pump body 120 and supporting the pump shaft 110 in a rotatble manner around its axis.

The pump case 130 includes a port block (center section) 140 in which a supply/suction oil passage for the hydraulic pump 120 is formed, and a pump case body 150 removably connected to the port block 140 so as to surround the hydraulic pump body 120.

The pump case body 150 has a first end face 151 abutted on the port block 140, a second end face 152 separated in the axis line direction of the pump shaft 110 from the first end face 151, and a peripheral wall 153 extending between the first end face 151 and the second end face 152 so as to surround the hydraulic pump body 120.

An opening into which the hydraulic pump body 120 can be inserted is formed in the first end face 151.

The port block 140 is connected to the first end face 151 of the pump case body 150 so as to liquid-tightly close the opening in a state of being fluidly connected to the hydraulic pump body 120.

Passages in the port block 140 will be described later.

The pump shaft 110 is supported at the both sides by the second end face 152 of the pump case body 150 and the port block 140 in a state where a first end 111 is projected outward so as to form an input end.

The hydraulic pump body 120 is supported by the pump shaft 110 so as to be located within a pump accommodating space defined by the pump case body 150 and the port block 140.

Specifically, the hydraulic pump body 120 has a cylinder block 121 supported in a relatively non-rotatable manner by the pump shaft 110, and a piston unit 122 slidable in the axis line direction and non-rotatable relative to the cylinder block 121.

At least one of the hydraulic pump unit 100 and the hydraulic motor unit is of a variable displacement type.

In the present embodiment, as shown in FIGS. 1 to 3, the hydraulic pump unit 100 is of the variable displacement type.

Therefore, as shown in FIG. 3, the hydraulic pump unit 100 includes a capacity adjusting mechanism 160 for changing the supply/suction oil amount of the hydraulic pump body 120 based on an external operation, in addition to the above configuration.

The capacity adjusting mechanism 160 has a movable swash plate 161 arranged within the pump accommodating space so as to be engaged with a free end of the piston unit 122 and configured so as to define the sliding range of the piston unit 122 in the axis line direction according to its tilting position, and a control shaft 162 for operating the tilting position of the movable swash plate 161.

As shown in FIG. 3, the control shaft 162 is supported in a rotatable manner around its axis line by the peripheral wall 153 of the pump case body 150 so that an inner end is located within the pump accommodating space and an outer end is projected outward.

Of the control shaft 162, the inner end is connected to the movable swash plate 161 via an arm member, and the outer end is connected to a control member such as a control lever via a proper linkage mechanism.

In the present embodiment, as shown in FIGS. 1 to 3, the hydraulic pump unit 100 includes a charge pump unit 160 for replenishing operation oil to the pair of operation fluid lines 300a, 300b, in addition to the above configuration.

In the present embodiment, the charge pump unit 170 includes a charge pump body 171 rotated and driven by the pump shaft 110, and a charge pump case 172 surrounding the charge pump body 171.

As shown in FIGS. 2, 3, in the present embodiment, the pump shaft 110 is configured so that a second end 112, which is the opposite end to the first end 111 forming the input end, penetrates the port block 140 and projects outward.

The second end 112 of the pump shaft 110 rotates and drives the charge pump body 171.

The charge pump case 172 is connected to the port block 140 so as to surround the charge pump body 171.

As shown in FIGS. 1 and 2, the charge pump case 172 is provided therein with a suction passage 351 having a first end opened at the outer surface to form a suction port 351 (P) and a second end fluidly connected to a suction side of the charge pump body 171, and a discharge passage 352 having a first end fluidly connected to a discharge side of the charge pump body 171 and a second end opened at the abutting surface with the port block 140 to form a discharge port 352 (P).

Furthermore, the charge pump case 172 is provided therein with a charge pressure setting passage 355 having a first end fluidly connected to the suction passage 351 and a second end fluidly connected to the discharge passage 352, and a relief valve 356 inserted into the charge pressure setting passage 355.

Herein, the passages in the port block 140 will be described.

Figure 4:
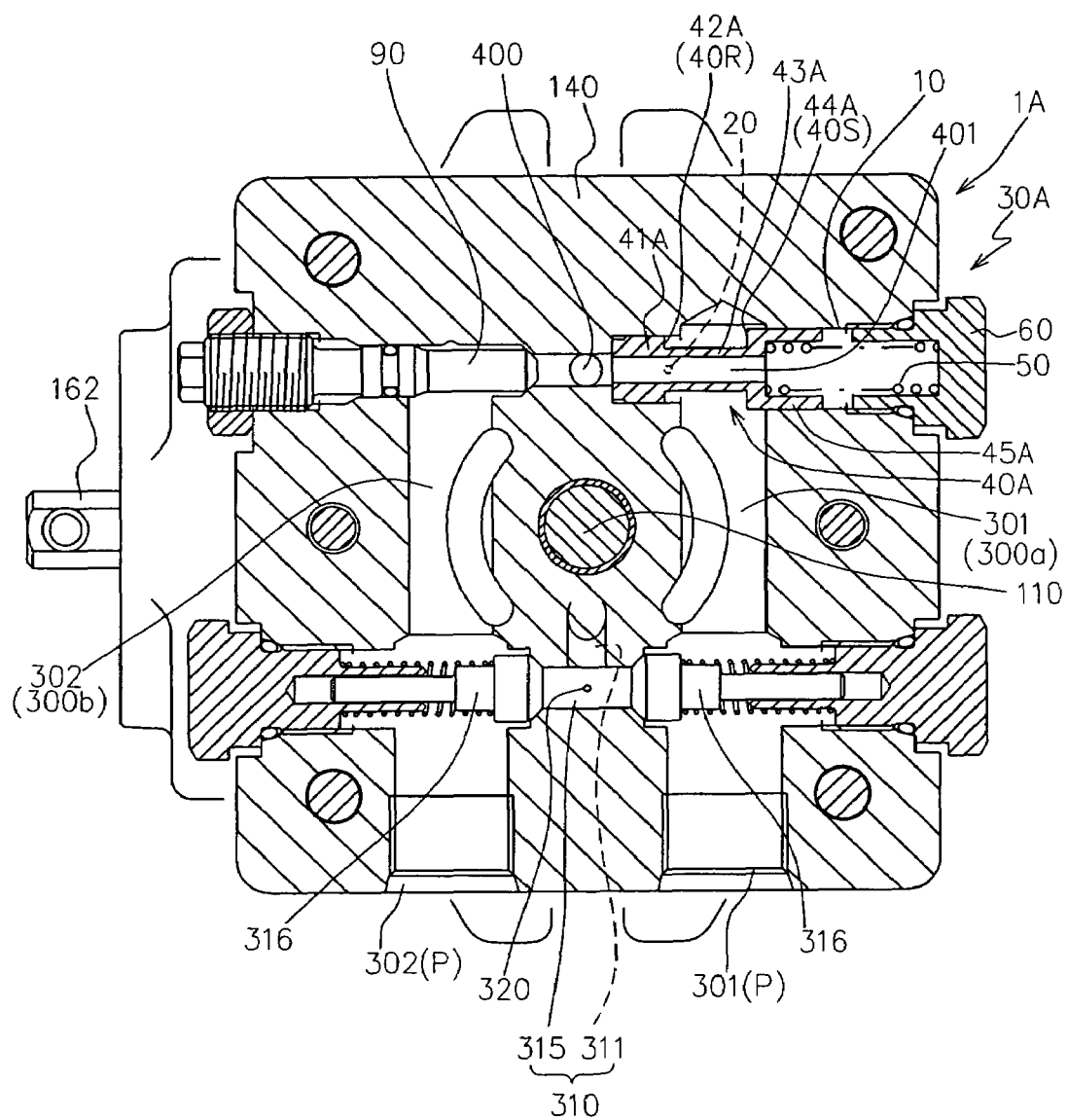
FIG. 4 is a cross sectional view taken along line IV-IV in FIG. 3.

FIG. 4 shows a cross sectional plan view of the port block taken along line IV-IV in FIG. 3.

As shown in FIGS. 1, 3 and 4, there are formed a first and second operation passage 301, 302 forming parts of the first and second operation fluid lines 300a, 300b, and a charge passage 310 for supplying pressure oil from the charge pump unit 160 to the first and second operation passages 301, 302 in the port block 140.

The first and second operation passages 301, 302 are distributed and arranged so as to sandwich the pump shaft 110, and are configured so that the first ends thereof are opened at the outer surfaces to form operation oil ports 301 (P), 302 (P) in a state where the first and second operation fluid passages 301, 302 are fluidly connected to the hydraulic pump body 110.

In the present embodiment, the first and second operation passages 301, 302 are formed in substantially parallel so as to sandwich the pump shaft 110, and are configured so that the first ends are opened at the outer surface of the port block 140 so as to form the operation oil ports 301 (P), 302 (P) and the second ends extend to the opposite side of the port block 140 with respect to the first end on the basis of the pump shaft 110 in a state where intermediate portions between the first ends and the second ends are fluidly connected to the hydraulic pump body 110.

The operation oil ports 301 (P), 302 (P) are fluidly connected to the hydraulic motor unit via operation oil conduits forming parts of the pair of operation fluid lines 300a, 300b.

The charge passage 310 has a first end opened at an abutting surface with the charge pump case 162 so as to form a charge port 310 (P) fluidly connected to the discharge port 352 (P), and a second end fluidly connected to each of the pair of operation passages 301,302.

In the present embodiment, the charge passage 310 has a branched charge passage 315 extending between the first and second operation passages 301, 302, and a common charge passage 311 having a first end opened at the abutting surface with the charge pump case 162 to form the charge port 310 (P) and a second end fluidly connected to the branched charge passage 315.

Check valves 316 are respectively inserted into the connecting points to fluidly connect the branched charge passage 315 to the first and second operation passages 301, 302, and thereby allowing the pressure oil to flow into the first and second operation passages 301, 302 from the branched charge passage 315, while preventing the reversed flow.

In the present invention, as shown in FIG. 4, the branched charge passage 315 is made into a linear shape of which both ends are opened at the outer surface, and the check valves 316 are respectively inserted from the openings of both the ends.

Furthermore, as shown in FIGS. 1 and 4, the port block 140 is provided therein with a self-suction passage 320 which has a first end fluidly connected to the branched charge passage 315 between the pair of check valves 316 and a second end fluidly connected to the oil reservoir (pump accommodating space), and into which an orifice 321 is inserted.

By the provision of the self-suction passage 320, when one of the pair of first and second operation passages 301,302 becomes negative pressure, oil is automatically sucked to the operation passage of the side of the negative pressure from the oil reservoir. Thereby, for example, a freewheel phenomenon, which may happen when suspending an engine with an HST being at a neutral state and stopping a working vehicle on a slope or the like, can be prevented.

That is, when the working vehicle is stopped in the condition, torque is added to a motor shaft operatively connected to a driving wheel, and the hydraulic motor unit tries to perform a pumping action.

In this case, when the pair of first and second operation fluid lines 300a, 300b are filled with the operation oil, brake force acts on the hydraulic motor unit by the operation oil. However, at the same time, one of the pair of first and second operation fluid lines 300a, 300b becomes high pressure by the pumping action of the hydraulic motor unit, and the operation oil may leak from the operation fluid line of the high pressure side.

If such operation oil leak occurs, the circulation of the oil takes place to the high pressure side operation fluid line from the negative pressure side operation fluid line, and the operation oil leak from the high pressure side operation fluid line is promoted. Finally, the operation oil in the pair of first and second operation fluid lines 300a, 300b is lost, and thereby the driving wheel starts to be freely rotated and the vehicle starts to descend the slope (freewheel phenomenon).

The freewheel phenomenon can be effectively prevented by the provision of the self-suction passage 320.

Furthermore, the port block 140 is provided therein with a neutral valve structure 1A according to the present embodiment.

As shown in FIGS. 1 and 4, the neutral valve structure 1A includes a linear installation passage 10 intersecting with a corresponding one (the first operation passage 301 in the present embodiment) of the first and second operation passages 301, 302 and having a tip end extending beyond the corresponding operation passage 301 and a base end opened at the outer surface of the port block 140, a releasing passage 20 for fluidly connecting a portion, of the installation passage 10, extending toward the tip side beyond the corresponding operation passage 301 to a low-pressure area, and a neutral valve 30A inserted into the installation passage 10 from the base end of the installation passage 10.

Various configurations can be used for the low-pressure area as long as the hydraulic pressure of the operation passage 301 can be released.

In the present invention, as shown in FIG. 1, the oil reservoir (the pump accommodating space) is adopted as the low-pressure area.

The neutral valve 30A includes a valve body 40A inserted into the installation passage 10 in a slidable manner along the axis line direction so as to straddle the corresponding operation passage 301 and capable of taking a releasing position on one side of the axis line direction where the corresponding operation passage 301 is fluidly connected to the releasing passage 20 and a closing position on the other side of the axis line direction where the corresponding operation passage 301 is fluidly disconnected to the releasing passage 20, a biasing member 50 having a tip end engaged to the valve body 40A so as to press the valve body 40A toward the releasing position on one side of the axis line direction, and a lid member 60 engaging a base end of the biasing member 50 and attached to the port block 140 so as to define a spring chamber for accommodating the biasing member 50 between the valve body 40A and the lid member 60.

The valve body 40A includes a closing-side pressure-receiving portion 40S for receiving the hydraulic pressure of the corresponding operation passage 301 so as to press the valve body 40A toward the closing position on the other side of the axis line direction against the urging force of the biasing member 50, and a releasing-side pressure-receiving portion 40R for receiving the hydraulic pressure of the corresponding operation passage 301 so as to press the valve body 40A toward the releasing position on one side of the axis line direction along with the biasing member 50. The closing-side pressure-receiving portion 40S has a receiving pressure area larger than that of the releasing-side pressure-receiving portion 40R.

In the present embodiment, the valve body 40A has a tip-end portion 41A liquid-tightly inserted into the portion, of the installation passage 10, located on its tip-end side on the basis of the operation passage 301, a base-end portion 45A of which at least a part is inserted liquid-tightly into a portion, of the installation passage 10, located on its base-end side on the basis of the operation passage 301, and a small-diameter portion 43A extending between the tip-end potion 41A and the base-end portion 45A and having a diameter smaller than those of the tip-end portion 41A and the base-end portion 45A.

In the configuration, a stepped portion 42A between the tip-end portion 41A and the small-diameter portion 43A forms the releasing-side pressure-receiving portion 40R, and a stepped portion 44A between the base-end portion 45A and the small-diameter portion 43A forms the closing-side pressure-receiving portion 40S.

The releasing passages 20 is opened to the installation passage 10 at the position which faces the small-diameter portion 43A when the valve body 40A is located at the releasing position, and which is blocked by the tip-end portion 41A when the valve body 40A is located at the closing position.

Preferably, the lid member 60 is attached to the port block 140 so as to be adjustable with respect to the position along the axis line direction of the valve body 40A. With the configuration, the initial urging force (urging force in a state where the hydraulic pressure of the corresponding operation passage 301 does not act) of the biasing member 50 can be simply adjusted.

In the neutral valve structure 1A having the above configuration, the valve body 40A takes the releasing position when the difference between the pressure to which the closing-side pressure-receiving portion 40S is applied and the pressure to which the releasing-side pressure-receiving portion 40R is applied, is smaller than the urging force due to the biasing member 50, and the valve body 40A takes the closing position when the pressure difference exceeds the urging force due to the biasing member 50.

That is, in a case where an operator operates the output adjusting member 160 so that the HST is set to a neutral state but the output adjusting member 160 is not correctly located at a neutral position, when the pressure difference is smaller than the urging force due to the biasing member 50, the operation oil in the corresponding operation passage 301 flows into the oil reservoir via the releasing passage 20. Therefore, the operator can maintain the hydraulic pressure of the corresponding operation passage 301 at a normal pressure to obtain the neutral state of the HST without making the output adjusting member locate at the neutral point strictly.

On the other hand, when the operator operates the output adjusting member 160 so that the corresponding operation passage 301 becomes high pressure for obtaining the output of the HST in either of one direction or the other direction, and the pressure difference exceeds the urging force of the biasing member 50, the corresponding operation passage 301 and the releasing passage 20 are fluidly disconnected to each other by the valve body 40A. Therefore, the operation oil of the corresponding operation passage 301 does not flow into the oil reservoir, and thereby, the deterioration of the transmission efficiency of the HST can be prevented.

Furthermore, in the neutral valve structure 1A, as described above, the position in the axis line direction of the valve body 40A is controlled by using the pressure difference between the closing-side pressure-receiving portion 40S and releasing-side pressure-receiving portion 40R as a pilot pressure.

Therefore, the miniaturization of the biasing member 50 can be attained as much as possible, whereby the miniaturization and low cost of the whole neutral valve structure can be obtained.

Preferably, as shown in FIG. 1, the releasing passage 20 may be provided with an orifice 410 therein.

By providing the orifice 410, when the valve body 40A of the neutral valve 30A is located at the releasing position, the amount of oil flowing out to the oil reservoir from the corresponding operation passage 301 can be suppressed.

In a case of using the HST as a travel system non-stepwisely changing speed transmission mechanism of a vehicle, the neutral valve 30A may be preferably arranged so as to act on a rearward-movement high-pressure-side operation passage that becomes high pressure when the vehicle moves rearward.

That is, when the pressure difference is smaller than the urging force of the biasing member 50 at the time of slow speed traveling or the like of the vehicle, as described above, the operation oil of the corresponding operation passage 301 flows into the oil reservoir via the releasing passage 20, and the HST transmission efficiency is worsened.

Therefore, considering that the rearward movement of the vehicle is fewer than the forward movement thereof, the neutral valve 30A is preferably arranged so as to act on the rearward-movement high-pressure-side operation passage.

As shown in FIGS. 1 and 4, the neutral valve structure 1A according to the present embodiment further includes a switch valve 90 for fluidly connecting the other (the second operation passage 302 in the present embodiment) of the first and second operation passages with the oil reservoir based on the manual operation from the outside.

By providing the configuration, in a case where the HST is used for the traveling system transmission mechanism of the vehicle, the generation of pressure difference between the pair of first and second operation passages 301,302 can be prevented even when the vehicle is compulsorily towed in any direction of a forward direction and rearward direction at the time of failure or the like of the vehicle.

For example, a configuration in which the neutral valve 30A is made to act on the rearward-movement high-pressure-side operation passage and the switch valve 90 is made to act on the forward-movement high-pressure-side operation passage will be described.

Since a large hydraulic pressure is not generated in the case of the forcible tow of the vehicle, in the case of the forcible tow in the rearward direction, the rearward-movement high-pressure-side operation passage is fluidly connected to the oil reservoir via the releasing passage 20 by the neutral valve 30A acting on the rearward-movement high-pressure-side operation passage. Therefore, the increase of the hydraulic pressure of the rearward-movement high-pressure-side operation passage is prevented.

In a case of the forcible tow of the vehicle in the forward direction, the increase of the hydraulic pressure of the forward-movement high-pressure-side operation passage can be prevented by fluidly connecting the forward-movement high-pressure-side operation passage with the oil reservoir by the switch valve 90.

As shown in FIG. 4, preferably, the tip end of the installation passage 10 is opened at the outer surface of the opposite side of the port block 140 in a state where the installation passage 10 penetrates the second operation passage 302, and the port block 140 is further provided therein with a drain passage 400 fluidly connected to the installation passage 10 at a position between the tip-end portion of the valve body 40A in the neutral valve 30A and the second operation passage 302.

By providing the configuration, the simplification of the installation structure of the neutral valve 30A and switch valve 90 can be attained.

More preferably, an axis line hole 401 for fluidly connecting the drain passage 400 with the spring chamber may be formed in the valve body 40A in the neutral valve 30A.

By providing the configuration, the drain passage 400 for the switch valve 90 can be also used as a drain passage for preventing the pressure of the inside of the spring chamber from being increased, and the simplification of the passage structure in the port block 140 can be attained.

More preferably, as shown in FIG. 4, the installation passage 10 may be orthogonal to the pair of operation passages 301,302, and the installation passage 10 may be arranged at the opposite side with respect to the branched charge passage 315 on the basis of the pump shaft 110.

By providing the configuration, the installation passage 10 and the branched charge passage 315 can be provided while attaining the miniaturization of the port block 140 as much as possible.

Embodiment 2

Hereinafter, a second embodiment of a neutral valve structure according to the present invention will be described referring to the accompanying drawings.

Figure 5:
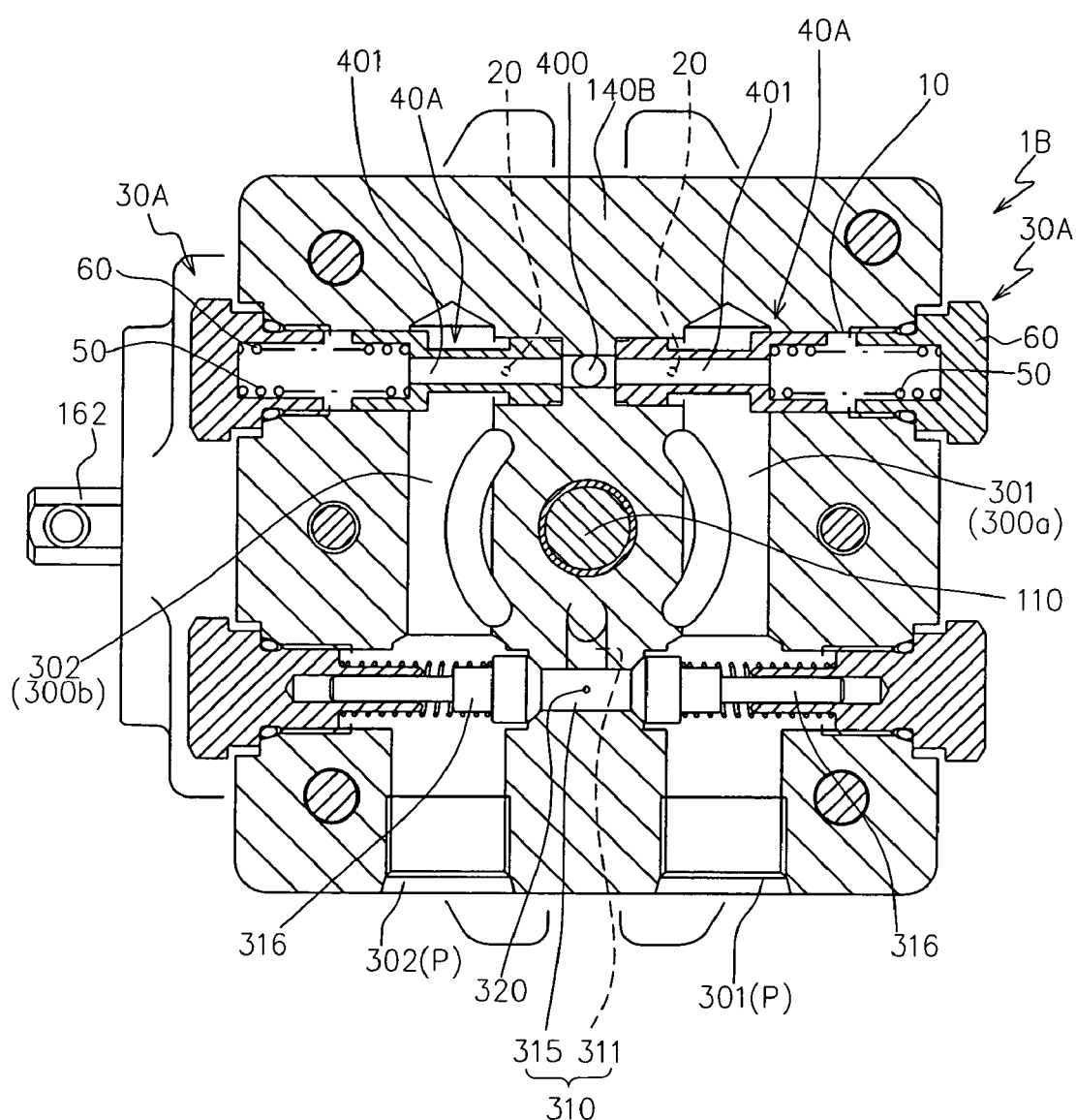
FIG. 5 is a cross sectional view of a port block in a hydraulic pump unit to which a neutral valve structure according to a second embodiment of the present invention is applied.

FIG. 5 shows a cross sectional view of a port block 140B in a hydraulic pump unit to which a neutral valve structure 1B according to the present embodiment is applied.

The same members as those of the embodiment 1 are designated by the same reference numerals, and the repeated description is omitted.

As shown in FIG. 5, the neutral valve structure 1B according to the present embodiment includes the neutral valve 30A acting on the second operation passage 302 instead of the switch valve 90 in the neutral valve structure 1A according to the embodiment 1.

That is, the neutral valve structure 1B includes the neutral valve 30A attached from the base-end-side opening of the installation passage 10 so as to act on the first operation passage 301, and the neutral valve 30A attached from the tip-end-side opening of the installation passage 10 so as to act on the second operation passage 302.

Even in the neutral valve structure 1B, the same effect as in the embodiment 1 can be obtained.

In the neutral valve structure 1B, the drain passage 400 acts as drain passages for spring chambers in both of the pair of neutral valves 30A.

However the configurations in which the neutral valve structures 1A, 1B are applied to the hydraulic pump unit in the above embodiments 1 and 2, it is, of course, possible to apply the neutral valve structures 1A, 1B to the other axial piston device such as the hydraulic motor unit.

Embodiment 3

Hereinafter, a third embodiment of a neutral valve structure according to the present invention will be described referring to the accompanying drawings.

In the present embodiment, explanation will be made with taking an example where the neutral valve structure according to the present invention is applied to an HST in which the hydraulic pump unit and the hydraulic motor unit are integrated.

Figure 6:
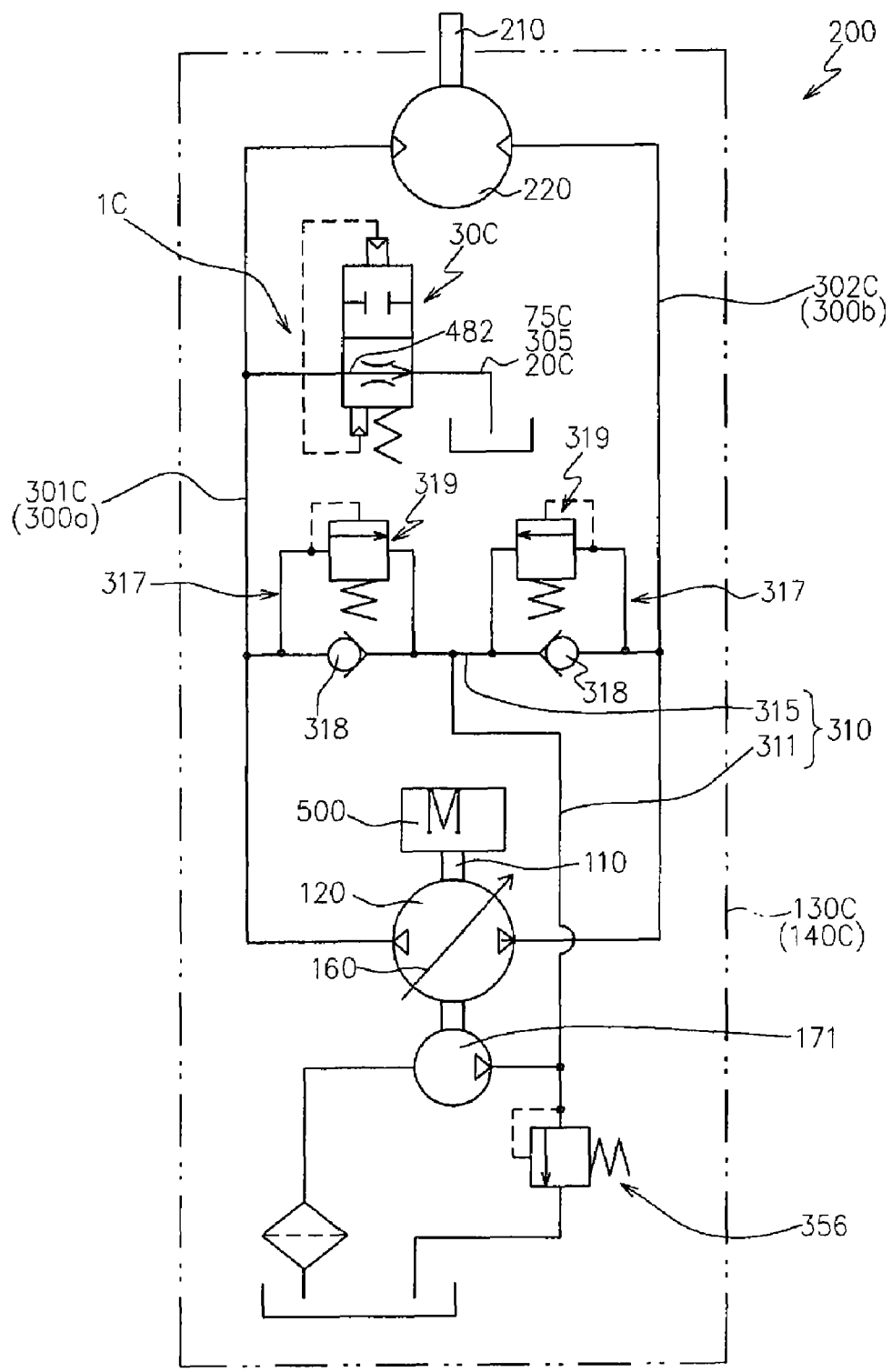
FIG. 6 is a hydraulic circuit diagram of an HST to which a neutral valve structure according to a third embodiment of the present invention is applied.

FIG. 6 shows a hydraulic circuit diagram of an HST 200 to which a neutral valve structure 1C according to the present embodiment is applied.

The same members as those of the embodiments 1, 2 are designated by the same reference numerals, and the repeated description is omitted.

As shown in FIG. 6, the HST 200 includes the pump shaft 110, the hydraulic pump body 120, a hydraulic motor body 220 fluidly connected to the hydraulic pump body 120 via the pair of first and second operation fluid lines 300a, 300b, a motor shaft 210 rotated and driven by the hydraulic motor body 220, the capacity adjusting mechanism 160 for changing the capacity of at least one (the hydraulic pump body 120 in the present embodiment) of the hydraulic pump body 120 and the hydraulic motor body 220, and an HST case 130C for accommodating the hydraulic pump body 120 and the hydraulic motor body 220 and for supporting the pump shaft 110 and the motor shaft 210 in a rotatable manner around its respective axis.

The HST 200 includes the charge pump body 171 in addition to the above configuration.

The HST case 130C includes a port block 140C in which a pair of first and second operation passages 301C, 302C configuring the pair of first and second operation fluid lines 300a, 300b are formed, and an HST case body (not shown) removably connected to the port block 140C so as to surround hydraulic pump body 120 and the hydraulic motor body 220.

Figure 7:
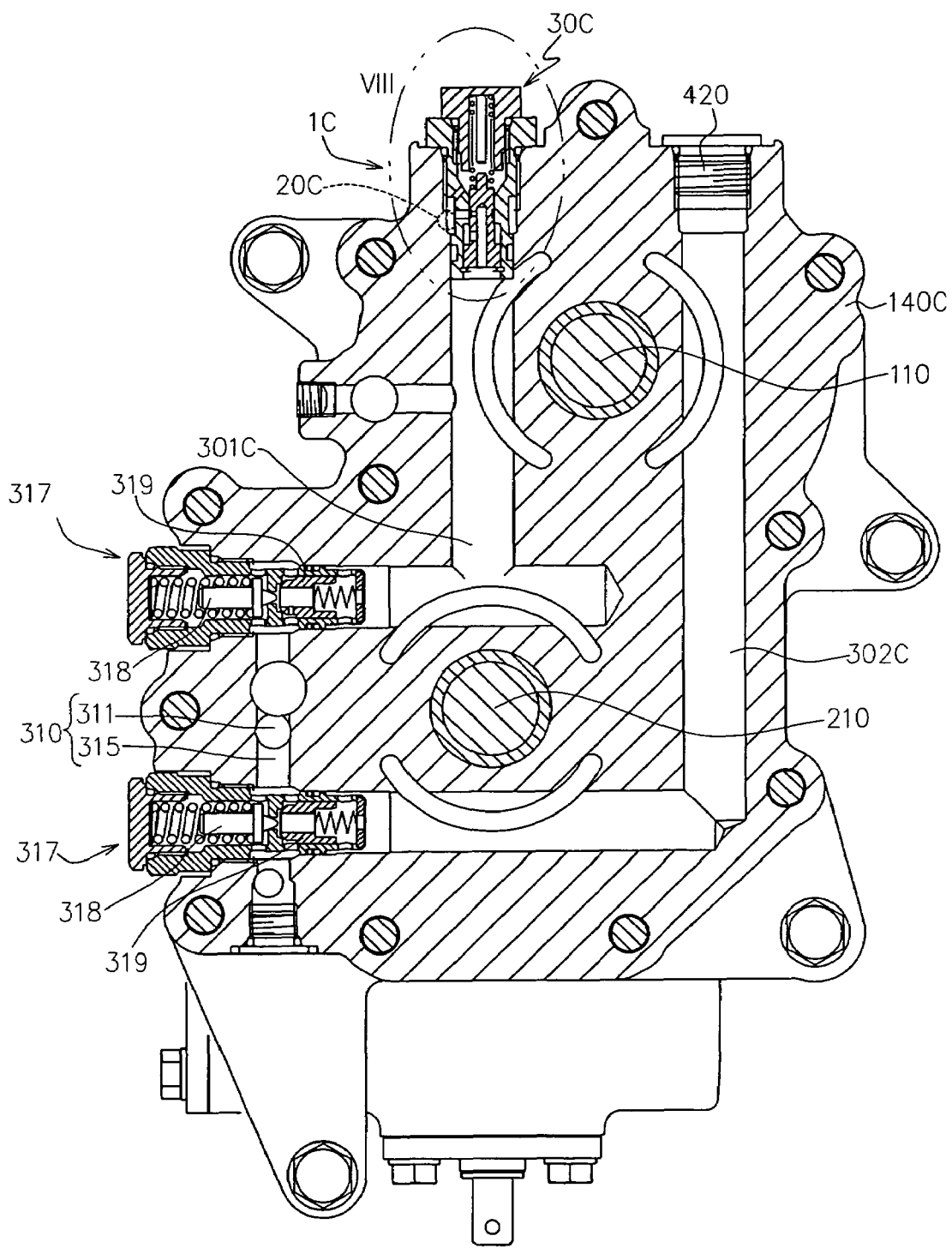
FIG. 7 is a cross sectional view of the port block in the HST shown in FIG. 6.

FIG. 7 shows a cross sectional view of the port block 140C.

As shown in FIGS. 6, 7, the port block 140C is provided therein with the pair of first and second operation passages 301C, 302C, the charge passage 310 including the common charge passage 311 and the branched charge passage 315, and the neutral valve structure 1C according to the present embodiment.

As shown in FIG. 7, the first and second operation passages 301C, 302C are configured so that the opposite ends thereof are opened at the outer surface of the port block 140C in a state where the first and second operation passages 301C, 302C sandwich the pump shaft 110 and the motor shaft 210 therebetween.

The branched charge passage 315 fluidly connects the first and second operation passages 301C, 302C to each other at a position near the first end openings of the first and second operation passages 301C, 302C.

Complex valves 317 are respectively attached into the first end openings of the first and second operation passages 301C, 302C so as to act on the connecting points where the branched charge passage 315 is fluidly connected with the first and second operation passages 301C, 302C.

The complex valve 317 includes a check valve 318 for allowing the pressure oil to flow from the branched charge passage 315 into the corresponding operation passage while preventing the reversed flow, and a relief valve 319 for relieving the hydraulic pressure of the corresponding operation passage into the branched charge passage 315 when the corresponding operation passage has an unusually high pressure.

The neutral valve structure 1C is provided in the port block 140C so as to act on at least one (the first operation passage 301C in the present embodiment) of the first and second operation passages 301C, 302C.

In the present embodiment, the neutral valve structure 1C includes a releasing passage 20C having a first end fluidly connected to the first operation passage 301C and a second end fluidly connected to a low-pressure area (the oil reservoir in the present embodiment), and a neutral valve 30C inserted into the first operation passage 301C so as to switch the fluid-connection or fluid-disconnection between the first operation passage 301C and the releasing passage 20C according to the hydraulic pressure of the first operation passage 301C.

As shown in FIG. 7, the releasing passage 20C is fluidly connected to the first operation passage 301C at a position near a second end opening of the first operation passage 301C.

The neutral valve 30C is inserted from the second end opening of the first operation passage 301C so as to act on the connecting point where the first operation passage 301C and the releasing passage 20C are fluidly connected to each other, while liquid-tightly closing the second end opening.

A second end opening of the second operation passage 302C is liquid-tightly closed by a plug 420.

Figure 8:
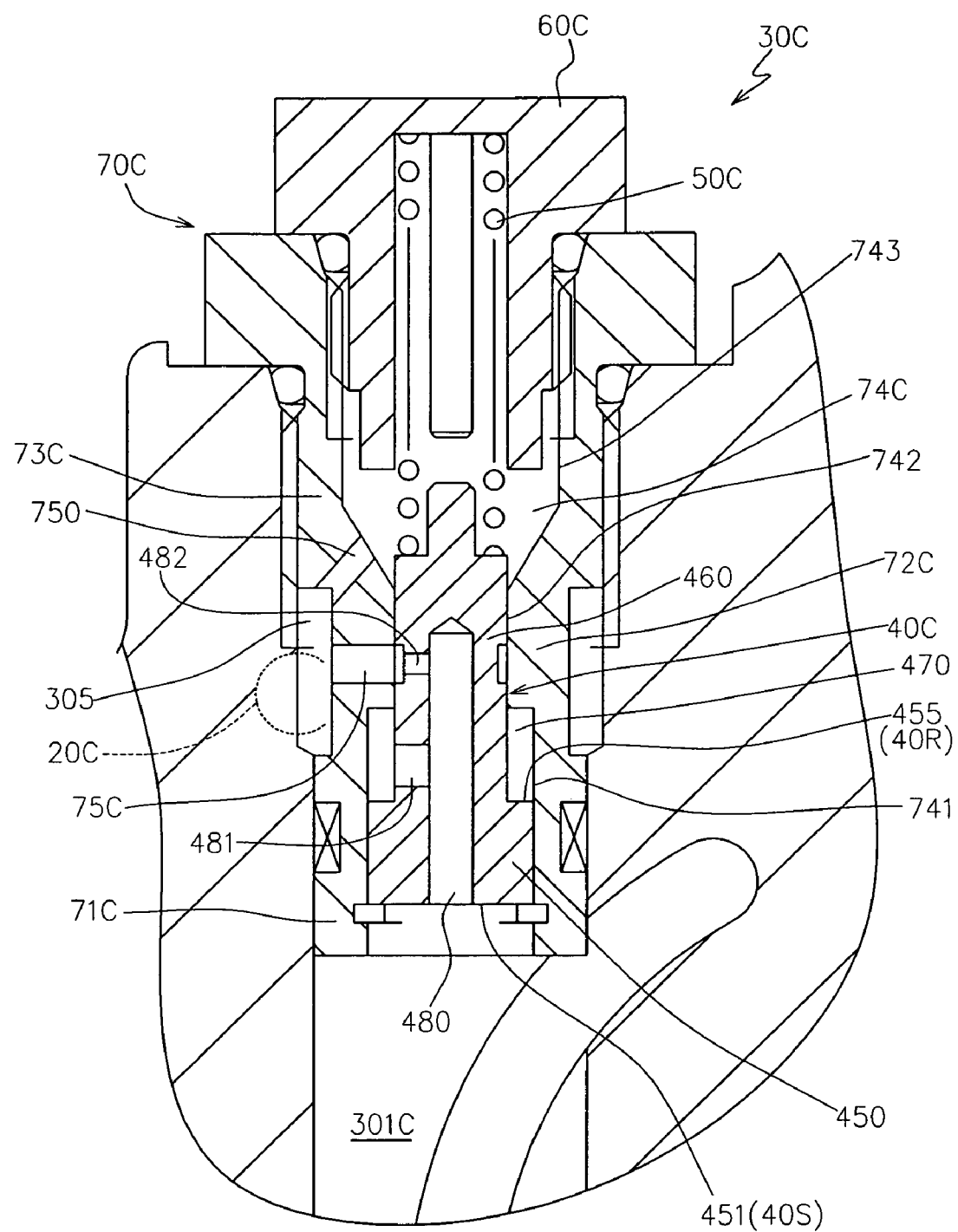
FIG. 8 is an enlarged view of VIII part in FIG. 7.

FIG. 8 shows an enlarged view of VIII part in FIG. 7.

The neutral valve 30C includes a valve body 40C inserted into the first operation passage 301C in a slidable manner along the axis line direction and capable of taking a releasing position on one side of the axis line direction for fluidly connecting the first operation passage 301C with the releasing passage 20C and a closing position on the other side of the axis line direction for fluidly disconnecting the first operation passage 301C with the releasing passage 20C, a biasing member 50C having a tip end engaged to the valve body 40C so as to urge the valve body 40C toward the releasing position on one side of the axis line direction, and a lid member 60C engaging a base end of the biasing member 50C and defining a spring chamber for accommodating the biasing member 50C between the valve body 40C and the lid member 60C.

FIG. 8 shows an enlarged view of part VIII in FIG. 7.

That is, the neutral valve 30C includes the valve case 70C attached to the corresponding first operation passage 301C, the valve body 40C accommodated within the valve case 70C in a slidable manner along the axis line direction so as to be capable of taking the releasing position on one side of the axis line direction and the closing position on the other side of the axis line direction, the lid member 60C attached to the valve case 70C so as to form the spring chamber between the valve body 40C and the lid member 60C, and the biasing member 50C inserted between the valve body 40C and the lid member 60C within the spring chamber.

The valve case 70C includes a tip-end portion 71C and a base-end portion 73C respectively located at the inner side and the outer side of the first operation passage 301C on the basis of the connecting portion where the first operation passage 301C and the releasing passage 20C are fluidly connected to each other, and an intermediate portion 72C located between the tip-end portion 71C and the base-end portion 73C.

The tip-end portion 71C and the base-end portion 73C respectively have outer circumference surfaces that are liquid-tight to the inner circumference surface of the first operation passage 301C.

On the other hand, the intermediate portion 72C has an outer circumference surface so that a space or a gap 305 exists between the inner circumference surface of the first operation passage 301C and the intermediate portion 72C at the connecting point where the releasing passage 20C and the first operation passage 301C are fluidly connected to each other.

Furthermore, the valve case 70C is provided therein with an axis line hole 74C extending between the end face of the tip-end portion 71C and the end face of the base-end portion 73C, and a first releasing passage 75C for fluidly connecting the space 305 and the axis line hole 74C with each other.

In detail, the axis line hole 74C includes a tip-side hole 741 opened to the end face of the tip-end portion 71C, a base-side hole 743 opened to the end face of the base-side portion 73C, and an intermediate hole 742 extending between the tip-side hole 741 and the base-side hole 743 and having a diameter smaller than that of the tip-side hole 741.

The first releasing passage 75C is configured so as to fluidly connect the intermediate hole 742 and the space 305 with each other.

The valve body 40C includes a large-diameter portion 450 liquid-tightly inserted into the tip-side hole 741, and a small-diameter portion 460 extending from the large-diameter portion toward the base end with a stepped portion 455.

The small-diameter portion 460 is liquid-tightly inserted into the intermediate hole 742 in a state where at least a part of the small-diameter portion 460 is located in the tip-side hole 741.

That is, as shown in FIG. 8, the valve body 40C is configured so that the large-diameter portion 450 is liquid-tight to the tip-side hole 741 and the small-diameter portion 460 is liquid-tight to the intermediate hole 742, in a state where a pocket portion 470 is defined between the outer circumference surface of a portion, of the small-diameter portion 460, which is located in the tip-side hole 741 and the inner circumference surface of the tip-side hole 741.

Furthermore, the valve body 40C is provided therein with a central hole 480 having a first end opened to the end face 451 of the large-diameter portion 450 and a second end blocked, a closing-side passage 481 for fluidly connecting the central hole 480 with the pocket portion 470, and a second releasing passage 482 arranged so that the fluid-connection or fluid-disconnection between the first releasing passage 75C and the central hole 480 are switched according to the position of the axis line direction of the valve body 40C.

In detail, the second releasing passage 482 is formed at a position, where the central hole 480 is fluidly connected to the first releasing passage 75C when the valve body 40C is located at the releasing position and the central hole 480 is fluidly disconnected to the first releasing passage 75C when the valve body 40C is located at the closing position.

Preferably, an orifice may be provided in the second releasing passage 482.

In the valve body 40C, the end face 451 of the large-diameter portion 450 forms the closing-side pressure-receiving portion 40S for receiving the hydraulic pressure of the first operation passage 301C so as to press the valve body 40C toward the closing position on the other side of the axis line direction against the urging force of the biasing member 50C. In addition to that, the stepped portion 455 between the large-diameter portion 450 and the small-diameter portion 460 forms the releasing-side pressure-receiving portion 40R for receiving the hydraulic pressure of the first operation passage 301C so as to press the valve body 40C toward the releasing position on one side of the axis line direction along with the biasing member 50C.

Preferably, the valve case 70C is provided therein with a communication passage 750 for fluidly connecting the spring chamber with the space 305.

By providing the configuration, the releasing passage 20C can be also used as the drain passage for the spring chamber.

The thus configured neutral valve structure 1C can have the same effect as that of the embodiment 1.

Though only the first operation passage 301C is provided with the neutral valve structure in the present embodiment, in addition to or instead of the configuration, the second operation passage 302C may be provided with a neutral valve structure.

However, the configuration in which the oil reservoir is used as the low-pressure area has been explained by way of example in each of the above embodiments, the neutral valve structure according to the present invention is not limited thereto.

That is, the other operation passage opposite to the operation passage, which is adjusted for the neutral state of HST, can be used as the low-pressure area.

The fluctuation of the oil amount of the operation oil in the pair of operation fluid lines can be prevented by using the other operation passage as the low-pressure area in place of the oil reservoir.

Therefore, the charge oil amount to the pair of operation fluid lines can be held nearly constant, thereby enhancing reliability and durability of the HST.

In the configuration using the other operation passage as the low-pressure area, a check valve is inserted into the releasing passage for allowing the operation oil to flow from the corresponding operation passage into the other operation passage while preventing the reversed flow.

By providing the check valve, even when the other operation passage is shifted to the high-pressure side, the operation oil can be prevented from flowing from the other operation passage into the corresponding operation passage which is neutrally adjusted, thereby preventing the deterioration of the transmission efficiency of the HST.

Embodiment 4

Hereinafter, a fourth embodiment of a neutral valve structure according to the present invention will be described referring to the accompanying drawings.

Figure 9:
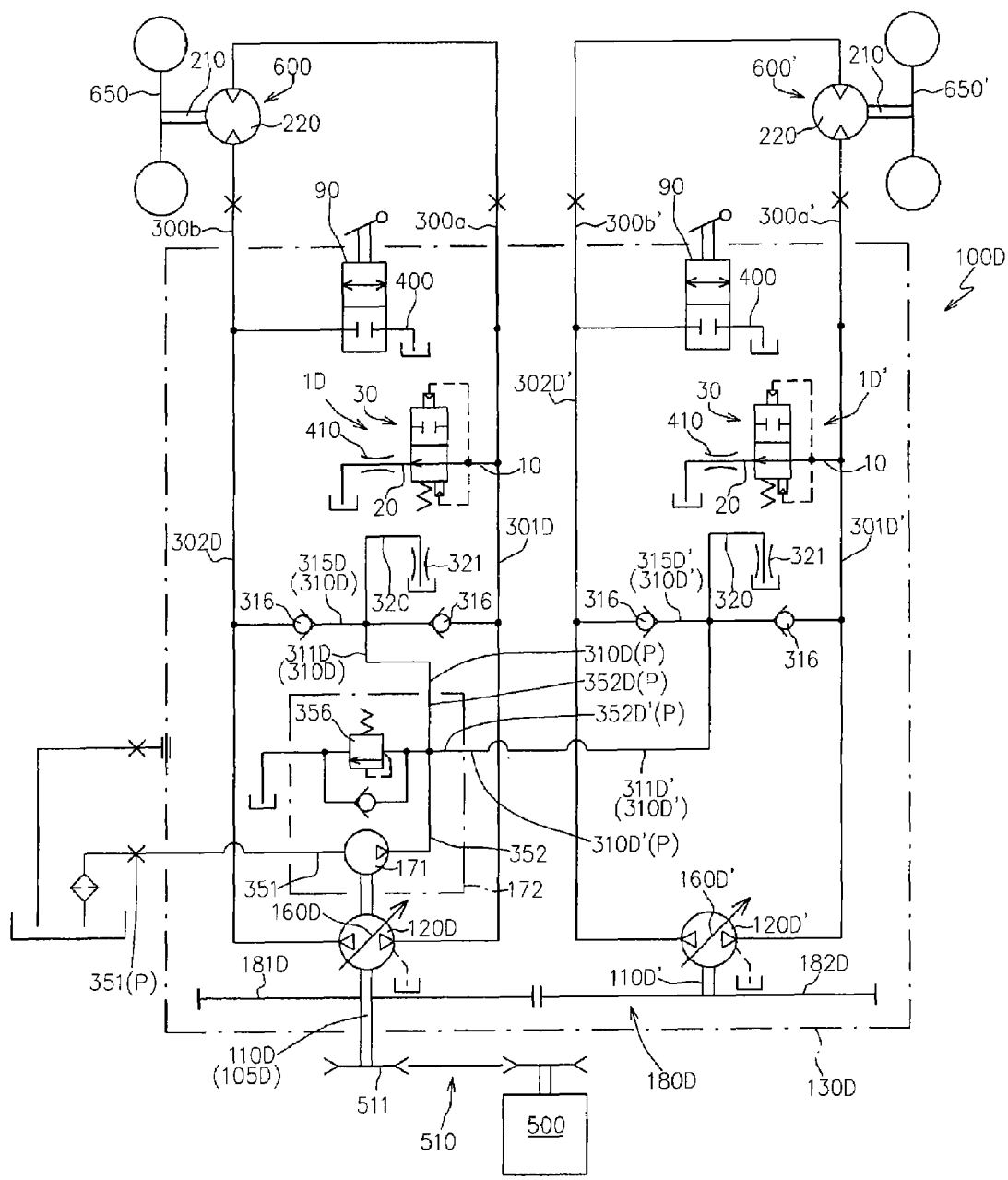
FIG. 9 is a hydraulic circuit diagram of a hydraulic pump unit to which neutral valve structures according to a fourth embodiment of the present invention are applied.

FIG. 9 shows a hydraulic circuit diagram of a hydraulic pump unit 100D to which neutral valve structures 1D, 1D' according to the present embodiment are applied.

Figure 10:
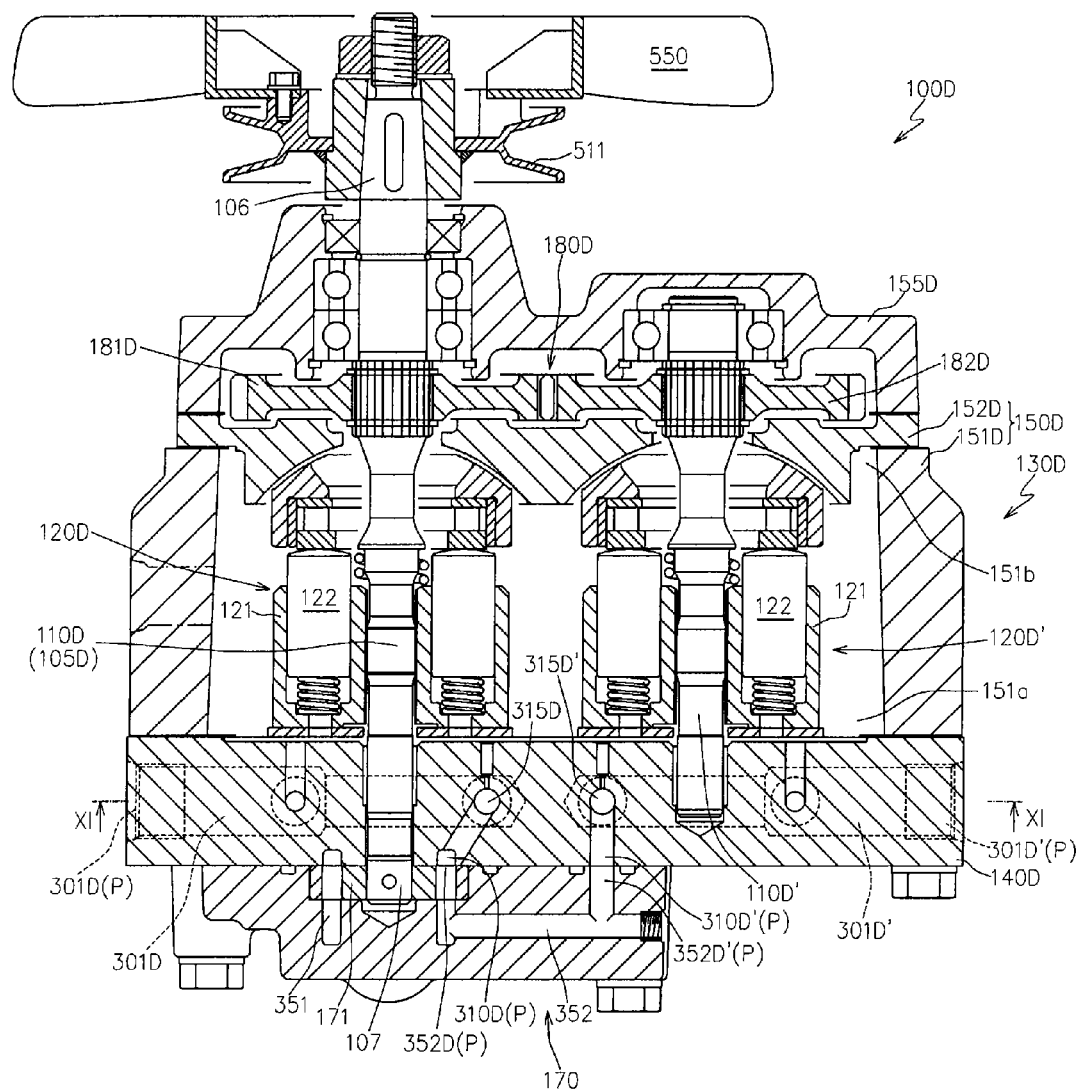
FIG. 10 is a longitudinal sectional view of the hydraulic pump unit shown in FIG. 9.
Figure 11:
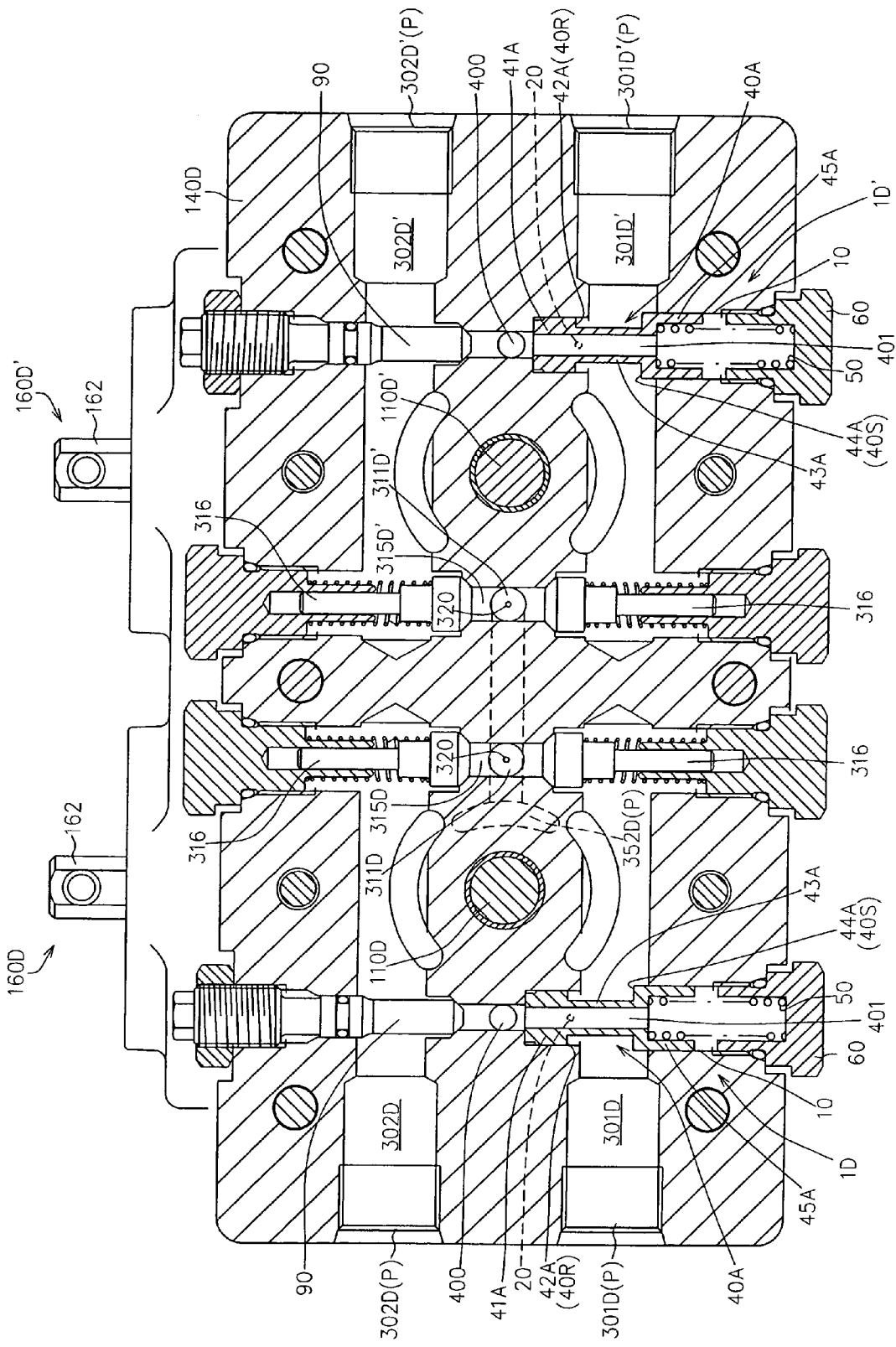
FIG. 11 is a sectional view taken along line XI-XI in FIG. 10.

FIG. 10 shows a longitudinal sectional view of the hydraulic pump unit 100D, and FIG. 11 shows a sectional view taken along line XI-XI in FIG. 10.

The same members as those of the embodiments 1 to 3 are designated by the same reference numerals, and the repeated description is promptly omitted.

As shown in FIGS. 9 to 11, the hydraulic pump unit 100D is a dual pump unit provided with a pair of hydraulic bodies 120D, 120D', and is configured so as to form first and second HSTs in cooperation with a pair first and second hydraulic motor units 600, 600'.

That is, the hydraulic pump unit 100D is configured so as to be fluidly connected to the first hydraulic motor unit 600 via a pair of first-HST-side first and second operation fluid lines 300a, 300b and be fluidly connected to the second hydraulic motor unit 600' via a pair of second-HST-side first and second operation fluid lines 300a', 300b'.

The first and second hydraulic motor units 600, 600' are provided with the hydraulic motor bodies 220 and the hydraulic motor shafts 210, the hydraulic motor shaft 210 operatively connected to corresponding driving wheels 650, 650' (see FIG. 9).

As shown in FIGS. 9 and 10, the hydraulic pump unit 100D includes an input shaft 105D operatively connected to the driving source 500, first and second pump shafts 110D, 110D', first and second hydraulic pump bodies 120D, 120D' respectively supported in a relatively non-rotatable manner by the first and second pump shafts 110D, 110D', a power transmission mechanism 180D for transmitting power from the input shaft 105D to the first and second pump shafts 110D, 110D', and a pump case 130D which accommodates the first and second hydraulic pump bodies 120D, 120D' and in which oil supply/suction passages are formed for the first and second hydraulic pump bodies 120D, 120D'.

As shown in FIG. 10, the pump case 130D includes a port block 140D in which the oil supply/suction passages for the first and second hydraulic pump bodies 120D, 120D' are formed, a pump case body 150D forming a pump accommodating space for accommodating the first and second hydraulic pump the bodies 120D, 120D' in cooperation with the port block 140D, and a lid member 155D forming a power transmission mechanism accommodation space for accommodating the power transmission mechanism 180D in cooperation with the pump case body 150D.

The pump case body 150D is made into a hollow shape so as to surround the first and second hydraulic pump bodies 120D, 120D' and have an opening into which the first and second hydraulic pump bodies 120D, 120D' can be inserted at a first end side of the axis line direction of the first and second pump shafts 110D, 110D'.

In the present embodiment, the pump case body 150D includes a hollow member 151D configured so as to surround the first and second hydraulic pump bodies 120D, 120D', and an end wall member 152D removably connected to the hollow member 151D.

The hollow member 151D has first and second openings 151a, 151b respectively formed at one side and the other side of the axis line direction. The first opening 151a has a size through which the first and second hydraulic pump bodies 120D, 120D' can be inserted.

The end wall member 152D is removably connected to the hollow member 151D so as to close the second opening 151b.

The port block 140D is removably connected to the pump case body 150D so as to liquid-tightly close the first opening 151a in a state of being fluidly connected to the first and second hydraulic pump bodies 120D, 120D'.

Passages in the port block 140D will be described later.

The lid member 155D is removably connected to the end wall member 152D so as to form the power transmission mechanism accommodation space between the lid member 155D and the end wall member 152D.

As shown in FIG. 10, the input shaft 105D is supported by the pump case 130D so that its first end 106 is projected outward to form the input end.

In the present embodiment, the input shaft 105D and the first pump shaft 110D are integrally formed by a single shaft.

That is, the single shaft is supported by the pump case 130D so that a first end extends outward to form the input end in a state of supporting the first hydraulic pump body 120D within the pump accommodating space.

In the present embodiment, the pulley 511 is provided in a relatively non-rotatable manner at the input end, and the input shaft 105D is operatively connected to the driving source 500 via a pulley transmission mechanism 510 including the pulley 511 (see FIG. 9).

In the present embodiment, as shown in FIG. 10, a cooling fan 550 is provided in addition to the pulley 511 at the input end.

Of course, it is possible that both of the first and second pump shafts 110D, 110D' are configured so that second ends thereof on a side near to the port block 140D project outward, and the cooling fan 550 is provided on at least one of the projected ends.

The second pump shaft 110D' is supported by the pump case 130D substantially in parallel with the single shaft.

In the present embodiment, as shown in FIG. 10, the opposite ends of the second pump shaft 110D' are ended within the pump case 130D. However, at least one or both of the opposite ends can be projected outward, and the projected end can be used as a power source for driving the other members.

The power transmission mechanism 180D is configured so as to transmit the power from the input shaft 105D to the first and second pump shafts 110D, 110D'.

As described above, in the present embodiment, the input shaft 105D is integrally formed with the first pump shaft 110D. Therefore, the power transmission mechanism 180D is configured so as to transmit the power from the single shaft to the second pump shaft 110D'.

Specifically, as shown in FIGS. 9, 10, the power transmission mechanism has a driving gear 181D supported in a relatively non-rotatable manner by the single shaft within the power transmission mechanism accommodation space, and a driven gear 182D supported in a relatively non-rotatable manner by the second pump shaft 110D' within the power transmission mechanism accommodation space so as to be engaged with the driving gear 181D.

The first and second hydraulic pump bodies 120D, 120D' have substantially the same constitution as those of the hydraulic pump body 120 in the embodiment 1. Therefore, the constituting members of the first and second hydraulic pump bodies 120D, 120D' are designated by the same reference numerals as those of the hydraulic pump body 120, and the repeated description is omitted.

As described above, the hydraulic pump unit 100D is configured so as to form the first and second HSTs in cooperation with the pair of hydraulic motor units 600, 600'. In the present embodiment, the hydraulic pump unit 100D is of the variable capacity type as in the embodiment 1.

Therefore, the hydraulic pump unit 100D is provided with a first capacity adjusting mechanism 160D for changing the supply/suction oil amount of the first hydraulic pump body 120D, and a second capacity adjusting mechanism 160D' for changing the supply/suction oil amount of the second hydraulic pump body 120D', in addition to the above configuration.

The first and second capacity adjusting mechanisms 160D, 160D' have substantially the same constitution as that of the capacity adjusting mechanism 160 in the embodiment 1. Therefore, the description of the constituting members of the first and second capacity adjusting mechanisms is omitted.

Furthermore, the hydraulic pump unit 100D is provided with the charge pump unit 170.

In the present embodiment, the single shaft is configured so that a second end 107 opposite to the first end 106, which forms the input end, is also projected outward, and the charge pump body 171 is driven by the second end 107.

Herein, the passages in the port block 140D will be described.

As shown in FIGS. 9 to 11, the port block 140D is provided therein with first-HST-side first and second operation passages 301D, 302D forming parts of the first-HST-side first and second operation fluid lines 300a, 300b, second-HST-side first and second operation passages 301D', 302D' forming parts of the second-HST-side first and second operation fluid lines 300a', 300b', a first-HST-side charge passage 310D for supplying pressure oil from the charge pump unit 160 to the first-HST-side first and second operation passages 301D, 302D, and a second-HST-side charge passage 310D' for supplying the pressure oil from the charge pump unit 160 to the second-HST-side first and second operation passages 301D', 302D'.

As shown in FIG. 11, the first-HST-side first and second operation passages 301D, 302D are distributed and arranged so as to sandwich the first pump shaft 110D, and are configured so that first ends thereof are opened at the outer surface to form the operation oil ports 301D (P), 302D (P) in a state where the first-HST-side first and second operation passages 301D, 302D are fluidly connected to the first hydraulic pump body 120D.

In the present embodiment, the first-HST-side first and second operation passages 301D, 302D are formed in substantially parallel with each other so as to sandwich the first pump shaft 110D. The first-HST-side first and second operation passages 301D, 302D are so configured that first ends are respectively opened to the outside at the one end face of the port block 140D so as to form the operation oil ports 301D (P), 302D (P) and second ends extend to the opposite side with respect to the first end on the basis of the first pump shaft 110D, and intermediate portions between the first ends and the second ends are fluidly connected to the first hydraulic pump the body 120D.

As shown in FIG. 11, the second-HST-side first and second operation passages 301D', 302D' are distributed and arranged so as to sandwich the second pump shaft 110D, and are configured so that first ends are opened at the outer surface to form operation oil ports 301D'(P), 302D'(P) in a state where the second-HST-side first and second operation passages 301D', 302D' are fluidly connected to the second hydraulic pump body 120D'.

In the present embodiment, the second-HST-side first and second operation passages 301D', 302D' are formed substantially in parallel with each other so as to sandwich the second pump shaft 110D'. The second-HST-side first and second operation passages 301D', 302D' are configured so that the first ends are opened at the outside at the other end face of the port block 140D so as to form the operation oil ports 301D' (P), 302D'(P), second ends extend to the opposite side with respect to the first ends on the basis of the second pump shaft 110D', and intermediate portions between the first ends and the second ends are fluidly connected to the second hydraulic pump the body 120D'.

The first-HST-side charge passage 310D has a first end fluidly connected to the discharge side of the charge pump body 171 and second ends respectively fluidly connected to the first-HST-side first and second operation passages 301D, 302D via the check valves 316.

In the present embodiment, as shown in FIGS. 9 to 11, the discharge passage 352 provided in the charge pump case 172 has a first-HST-side discharge port 352D (P) and a second-HST-side discharge port 352D'(P).

Therefore, the first end of the first-HST-side charge passage 310D is opened at the abutting surface with the charge pump case 172 so as to form a charge port 310D (P) fluidly connected to the first-HST-side discharge port 352D (P) (see FIG. 10).

In the present embodiment, as shown in FIGS. 9, 11, the charge passage 310 has a first-HST-side branched charge passage 315D extending between the first-HST-side first and second operation passages 301D, 302D, and a first-HST-side common charge passage 311D having a first end opened at the abutting surface with the charge pump case 172 to form the charge port 310D (P) and a second end fluidly connected to the first-HST-side branched charge passage 315D.

The second-HST-side charge passage 310D' has the substantially same constitution as that of the first-HST-side charge passage 310D. Therefore, the corresponding members of the second-HST-side charge passage 310D' are designated by the same reference numerals or the same reference numerals with adding subscript with "'" as those of the first-HST-side charge passage 310D, and thus the detailed description thereof is omitted.

In the present embodiment, the first-HST-side branched charge passage 315D and the second-HST-side branched charge passage 315D' are arranged so as to be closed or adjacent to each other.

That is, as shown in FIG. 11, the first-HST-side branched charge passage 315D is arranged so as to fluidly connect the second ends of the first-HST-side first and second operation passages 301D, 302D, and the second-HST-side branched charge passage 315D' is arranged so as to fluidly connect the second ends of the second-HST-side first and second operation passages 301D, 302D.

By arranging the first-HST-side branched charge passage 315D and the second-HST-side branched charge passage 315D' so as to be adjacent to each other, as described above, it is possible to shorten the charge line extending from the charge pump body 171 to each of the operation passages 301D, 302D, 301D', 302D'. Thereby, charge oil can be efficiently supplied from the charge pump unit 170 to the first-HST-side first and second operation passages 301D, 302D, and the second-HST-side first and second operation passages 301D', 302D'.

As shown in FIG. 11, both of the first-HST-side branched charge passage 315D and the second-HST-side branched charge passage 315D' are configured so as to be linear shape, in which the opposite ends thereof are opened at the outer surface as in the branched charge passage 315 in the embodiment 1, and the check valves 316 are inserted from the openings of the respective opposite ends.

The port block 140D is also provided with self-suction oil passages 320, which are substantially the same as that of the embodiment 1, for both the first-HST-side branched charge passage 315D and the second-HST-side branched charge passage 315D'.

Furthermore, as shown in FIGS. 9 and 11, the port block 140D is provided with a first-HST-side neutral valve structure 1D acting on the first HST, and a second-HST-side neutral valve structure 1D' acting on the second HST.

The first-HST-side neutral valve structure 1D and the second-HST-side neutral valve structure 1D' have the substantially same constitution as that of the neutral valve structure 1A in the embodiment 1. Therefore, the same reference numerals as those of the constituting members of the neutral valve structure 1A are given to the constituting members of the first-HST-side and second-HST-side neutral valve structures 1D, 1D', and the repeated description is omitted.

Preferably, as shown in FIG. 11, the installation passage 10 of the first-HST-side neutral valve structure 1D may be arranged at the opposite side with respect to the first-HST-side branched charge passage 315D on the basis of the first pump shaft 110D, and the installation passage 10 of the second-HST-side neutral valve structure 1D' may be arranged at the opposite side with respect to the second-HST-side branched charge passage 315D' on the basis of the second pump shaft 110D'.

With these configurations, the charge passage 310D and the first-HST-side and second-HST-side neutral valve structures 1D, 1D' can be efficiently arranged while attaining the miniaturization of the port block 140D as much as possible.

This specification is by no means intended to restrict the present invention to the preferred embodiments set forth therein. Various modifications to the neutral valve structure may be made by those skilled in the art without departing from the spirit and scope of the present invention as defined in the appended claims.

What is claimed is:

1. A neutral valve structure applied to at least one of a pair of operation fluid lines in an HST, comprising:
   (a) a port block formed with first and second operation passages that form at least parts of the pair of operation fluid lines and an installation passage;
   (b) a valve body inserted in the installation passage in a slidable manner in the axis line direction so as to take a closing position where the corresponding operation fluid line is liquid-tightly closed and a releasing position where the corresponding operation fluid line is released to a low-pressure area;
   (c) a biasing member inserted in the installation passage for urging the valve body toward the releasing position on one side of the axis line direction;
   (d) a lid member attached to the port block so as to close an opening end of the installation passage to engage a base end of the biasing member and define a spring chamber for accommodating the biasing member between the valve body and the lid member; and
   (e) the valve body including:
       (i) a closing-side pressure-receiving portion for receiving the hydraulic pressure of the corresponding operation fluid line so as to press the valve body toward the closing position on the other side of the axis line direction against the urging force of the biasing member;

(ii) a releasing-side pressure-receiving portion for receiving the hydraulic pressure of the corresponding operation fluid line so as to press the valve body toward the releasing position on one side of the axis line direction along with the biasing member; and (iii) the closing-side pressure-receiving portion having a receiving pressure area larger than that of the releasing-side pressure-receiving portion; and (f) the lid member being threaded into the opening end of the installation passage so as to be position-adjustable with respect to the axis line direction of the valve body.

2. The neutral valve structure according to claim 1, wherein the corresponding operation fluid line is released to the low-pressure area via an orifice when the valve body is located at the releasing position.

3. The neutral valve structure according to claim 1, wherein the low-pressure area is an oil reservoir.

4. The neutral valve structure according to claim 1, wherein the low-pressure area is the other operation fluid line.

5. The neutral valve structure according to claim 4, wherein the corresponding operation fluid line is fluidly connected to the other operation fluid line acting as the low-pressure area via a check valve, and (a) the check valve is arranged to allow the oil to flow from the corresponding operation fluid line into the other operation fluid line while preventing a reversed flow.

6. A neutral valve structure applied to a port block in which a pair of first and second operation passages configuring at least parts of a pair of operation fluid lines in an HST are formed substantially in parallel with each other, (a) the port block including:
  (i) a linear installation passage intersecting with the first operation passage and having a tip end extending beyond the first operation passage and a base end opened to an outer surface;
  (ii) a releasing passage having a first end fluidly connected to a portion, of the installation passage, extending to the tip-end side beyond the first operation passage and a second end fluidly connected to a low-pressure area; and
  (iii) a neutral valve inserted into the installation passage from the base end and switching fluid-connection or fluid-disconnection between the first operation passage and releasing passage according to the hydraulic pressure of the first operation passage;

(b) the neutral valve including:
  (i) a valve body inserted into the installation passage in a slidable manner along the axis line direction so as to straddle the first operation passage, the valve body capable of taking a releasing position on one side of the axis line direction where the first operation passage and the releasing passage are fluidly connected to each other, and a closing position on the other side of the axis line direction where the first operation passage and the releasing passage are fluidly disconnected to each other;
  (ii) a biasing member having a tip end engaged to the valve body so as to urge the valve body toward the releasing position on one side of the axis line direction; and
  (iii) a lid member engaging a base end of the biasing member and defining a spring chamber for accommodating the biasing member between the valve body and the lid member; and (c) the valve body including:
  (i) a closing-side pressure-receiving portion for receiving the hydraulic pressure of the first operation passage so as to press the valve body toward the closing position on the other side of the axis line direction against the urging force of the biasing member; and
  (ii) a releasing-side pressure-receiving portion for receiving the hydraulic pressure of the first operation passage so as to press the valve body toward the releasing position on one side of the axis line direction along with the biasing member, the releasing-side pressure-receiving portion having a receiving pressure area smaller than that of the closing-side pressure-receiving portion.

7. The neutral valve structure according to claim 6, wherein the installation passage is arranged to be intersected with the first and second operation passages at right angles.

8. The neutral valve structure according to claim 6, wherein the releasing passage is provided with an orifice.

9. The neutral valve structure according to claim 6, wherein the second end of the releasing passage is fluidly connected to an oil reservoir.

10. The neutral valve structure according to claim 6, wherein the second end of the releasing passage is fluidly connected to the other operation passage.

11. The neutral valve structure according to claim 10, wherein the releasing passage is provided with a check valve for allowing oil to flow from the corresponding operation passage into the other operation passage while preventing the reversed flow.

12. A neutral valve structure applied to a port block in which a pair of first and second operation passages configuring at least parts of a pair of operation fluid lines in the HST are formed substantially in parallel with each other, (a) the port block including:
  (i) a linear installation passage intersecting with the first and second operation passages and having first and second ends respectively near to the first and second operation passages, both of the first and second ends opened at an outer surface;
  (ii) a drain passage fluidly connected to the installation passage between the first and second operation passages;
  (iii) a releasing passage having a first end fluidly connected to the installation passage between the first operation passage and the drain passage and a second end fluidly connected to a low-pressure area;
  (iv) a neutral valve inserted into the installation passage from the first end and switching fluid-connection or fluid-disconnection between the first operation passage and the releasing passage according to the hydraulic pressure of the first operation passage; and
  (v) a switch valve inserted into the installation passage from the second end and switching fluid-connection or fluid-disconnection between the second operation passage and the drain passage according to a manual operation;

(b) the neutral valve including:
  (i) a valve body inserted into the installation passage in a slidable manner along the axis line direction so as to straddle the first operation passage, the valve body capable of taking a releasing position on one side of the axis line direction where the first operation passage and the releasing passage are fluidly connected to each other and a closing position on the other side of the axis line direction where the first operation passage and the releasing passage are fluidly disconnected to each other;

(ii) a biasing member having a tip end engaged to the valve body so as to urge the valve body toward the releasing position on one side of the axis line direction; and (iii) a lid member engaging a base end of the biasing member and defining a spring chamber for accommodating the biasing member between the valve body and the lid member; and (c) the valve body including:

(i) a closing-side pressure-receiving portion for receiving the hydraulic pressure of the first operation passage so as to press the valve body toward the closing position on the other side of the axis line direction against the urging force of the biasing member;

(ii) a releasing-side pressure-receiving portion for receiving the hydraulic pressure of the first operation passage so as to press the valve body toward the releasing position on one side of the axis line direction along with the biasing member, the releasing-side pressure-receiving portion having a receiving pressure area smaller than that of the closing-side pressure-receiving portion; and (iii) an axis line hole for fluidly connecting the spring chamber and the drain passage.

* * * * *